US012719795B2

(12) United States Patent
Coster et al.

(10) Patent No.: US 12,719,795 B2
(45) Date of Patent: Aug. 25, 2026

(54) SYSTEMS AND METHODS FOR DIRECTLY ESTIMATING POWER UTILIZATION EFFECTIVENESS OF ONE OR MORE DATA HANDLING FACILITIES OF A COMMUNICATION SYSTEM

(71) Applicant: T-Mobile Innovations LLC, Overland Park, KS (US)

(72) Inventors: John Coster, Seattle, WA (US); Sean Michael Clarke Seemann, Seattle, WA (US); Yun-ling Jocelyn Wang, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 96 days.

(21) Appl. No.: 18/882,589

(22) Filed: Sep. 11, 2024

(65) Prior Publication Data

US 2026/0075000 A1 Mar. 12, 2026

(51) Int. Cl.

| | |
|---|---|
| ***H04L 47/125*** | (2022.01) |
| ***G06Q 50/06*** | (2024.01) |
| ***H04L 67/12*** | (2022.01) |

(52) U.S. Cl.

CPC ............ *H04L 47/125* (2013.01); *H04L 67/12* (2013.01); *G06Q 50/06* (2013.01)

(58) Field of Classification Search

CPC ........ H04L 47/125; H04L 67/12; G06Q 50/06
See application file for complete search history.

(56) References Cited

U.S. PATENT DOCUMENTS

| | | | |
|---|---|---|---|
| 2006/0033606 A1 | 2/2006 | Howarth et al. | |
| 2007/0234427 A1 | 10/2007 | Gardner et al. | |
| 2016/0187395 A1* | 6/2016 | Bodas | G06Q 10/06 702/60 |
| 2017/0201425 A1* | 7/2017 | Marinelli | G06F 11/3058 |
| 2017/0302557 A1 | 10/2017 | Brooks et al. | |
| 2019/0171510 A1 | 6/2019 | Smith et al. | |

(Continued)

OTHER PUBLICATIONS

Bahuleyan, Manjith, et al., "Ontology System Data Validation for Monitoring Communication System Data Handling Facilities," filed Mar. 5, 2024, U.S. Appl. No. 18/596,365.

(Continued)

*Primary Examiner* — Brian Whipple

(57) ABSTRACT

A method for directly estimating PUE of one or more data handling facilities of a communication system. The method includes receiving a facility power dataset generated by a plurality of power monitors connected between electrically powered equipment of data handling facility of the one or more data handling facilities, and classifying data as belonging to either a productive power consumption group or a nonproductive power consumption group to provide a labeled facility power dataset. The method additionally includes creating by a PUE profile engine a PUE profile of the data handling facility using at least the labeled facility power dataset, the PUE profile containing an estimated PUE of the data handling facility based on the labeled facility power dataset, and continually and automatically updating by the PUE profile engine the estimated PUE of the PUE profile as the facility power dataset is received and provide the labeled facility power dataset.

20 Claims, 9 Drawing Sheets

(56) References Cited

U.S. PATENT DOCUMENTS

| | | | |
|---|---|---|---|
| 2023/0230010 | A1 | 7/2023 | Ramachandran et al. |
| 2024/0273647 | A1* | 8/2024 | Makara .................. G06Q 50/06 |
| 2025/0285063 | A1 | 9/2025 | Bahuleyan et al. |
| 2025/0310203 | A1 | 10/2025 | Bahuleyan et al. |

OTHER PUBLICATIONS

Bahuleyan, Manjith, et al., "Ontology Systems for Monitoring Data Handling Facilities of a Communication System," filed Mar. 26, 2024, U.S. Appl. No. 18/617,598.

Bahuleyan, Manjith, et al., "Systems and Methods for Monitoring Stranded Power Capacity in the Power Distribution of Communication Systems," filed Jun. 25, 2025, U.S. Appl. No. 19/249,742.

Office Action dated Jun. 1, 2026, U.S. Appl. No. 18/596,365, filed Mar. 4, 2024.

* cited by examiner

SYSTEMS AND METHODS FOR DIRECTLY ESTIMATING POWER UTILIZATION EFFECTIVENESS OF ONE OR MORE DATA HANDLING FACILITIES OF A COMMUNICATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication systems, including systems incorporating telecommunications and data networks, rely on robust and scalable data handling infrastructure to support the increasing demand for high-speed data transfer and low-latency communication across the communication system. Particularly, data handling facilities, such as data handling facilities (e.g., data centers, mini-data centers, mobile switching offices), form the backbone of communication systems by providing centralized storage, processing, and management of data communicated thereacross.

SUMMARY

In an embodiment, a method for directly estimating power utilization effectiveness (PUE) of one or more data handling facilities of a communication system is disclosed. The method includes receiving by a PUE monitoring system a first facility power dataset generated by a plurality of power monitors connected between electrically powered equipment of first data handling facility of the one or more data handling facilities, wherein the first facility power dataset is representative of electrical power consumed by the electrically powered equipment of the first data handling facility. Additionally, the method includes classifying by the PUE monitoring system data contained in the received first facility power dataset as belonging to either a productive power consumption group of the first data handling facility or a nonproductive power consumption group of the first data handling facility to provide a labeled first facility power dataset. Additionally, the method includes creating by a PUE profile engine of the PUE monitoring system a first PUE profile of the first data handling facility using at least the labeled first facility power dataset, the first PUE profile containing an estimated first PUE of the first data handling facility based on the labeled first facility power dataset. Further, the method includes continually and automatically updating by the PUE profile engine the estimated first PUE of the PUE profile as the PUE monitoring system continues to receive the first facility power dataset and provide the labeled first facility power dataset.

Another embodiment of a method for directly estimating PUE of one or more data handling facilities of a communication system is disclosed. The method includes, receiving by a PUE monitoring system a first facility power dataset generated by a plurality of power monitors connected between electrically powered equipment of first data handling facility of the one or more data handling facilities, wherein the first facility power dataset is representative of electrical power consumed by the electrically powered equipment of the first data handling facility. Additionally, the method includes classifying by the PUE monitoring system data contained in the received first facility power dataset as belonging to either a productive power consumption group of the first data handling facility or a nonproductive power consumption group of the first data handling facility to provide a labeled first facility power dataset, and creating by a PUE profile engine of the PUE monitoring system a first PUE profile of the first data handling facility using at least the labeled first facility power dataset, the first PUE profile containing a first PUE model of the first data handling facility that is based on the labeled first facility power dataset. Further, the method includes receiving by a query tool of the PUE monitoring system a query from a user pertaining to the first data handling facility and including a user-defined PUE parameter corresponding to at least one of an equipment feature and an operating environment feature of the first data handling facility, and estimating by the PUE profile engine a predicted PUE of the first data handling facility using the first PUE model and the PUE parameter.

Another embodiment of a method for directly estimating PUE of one or more data handling facilities of a communication system is disclosed. The method includes receiving by a PUE monitoring system a first facility power dataset generated by a plurality of power monitors connected between electrically powered equipment of first data handling facility of the one or more data handling facilities, wherein the first facility power dataset is representative of electrical power consumed by the electrically powered equipment of the first data handling facility. Additionally, the method includes classifying by the PUE monitoring system data contained in the received first facility power dataset as belonging to either a productive power consumption group of the first data handling facility or a nonproductive power consumption group of the first data handling facility to provide a labeled first facility power dataset, and creating by a PUE profile engine of the PUE monitoring system a first PUE profile of the first data handling facility using at least the labeled first facility power dataset, the first PUE profile containing a temperature-dependent first PUE model of the first data handling facility that is based on both the labeled first facility power dataset and climatic data associated with a physical location of the first data handling facility. Further, the method includes providing by the PUE profile engine an estimated first PUE of the first data handling facility using the labeled first facility power dataset, the climatic data, and the first PUE profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
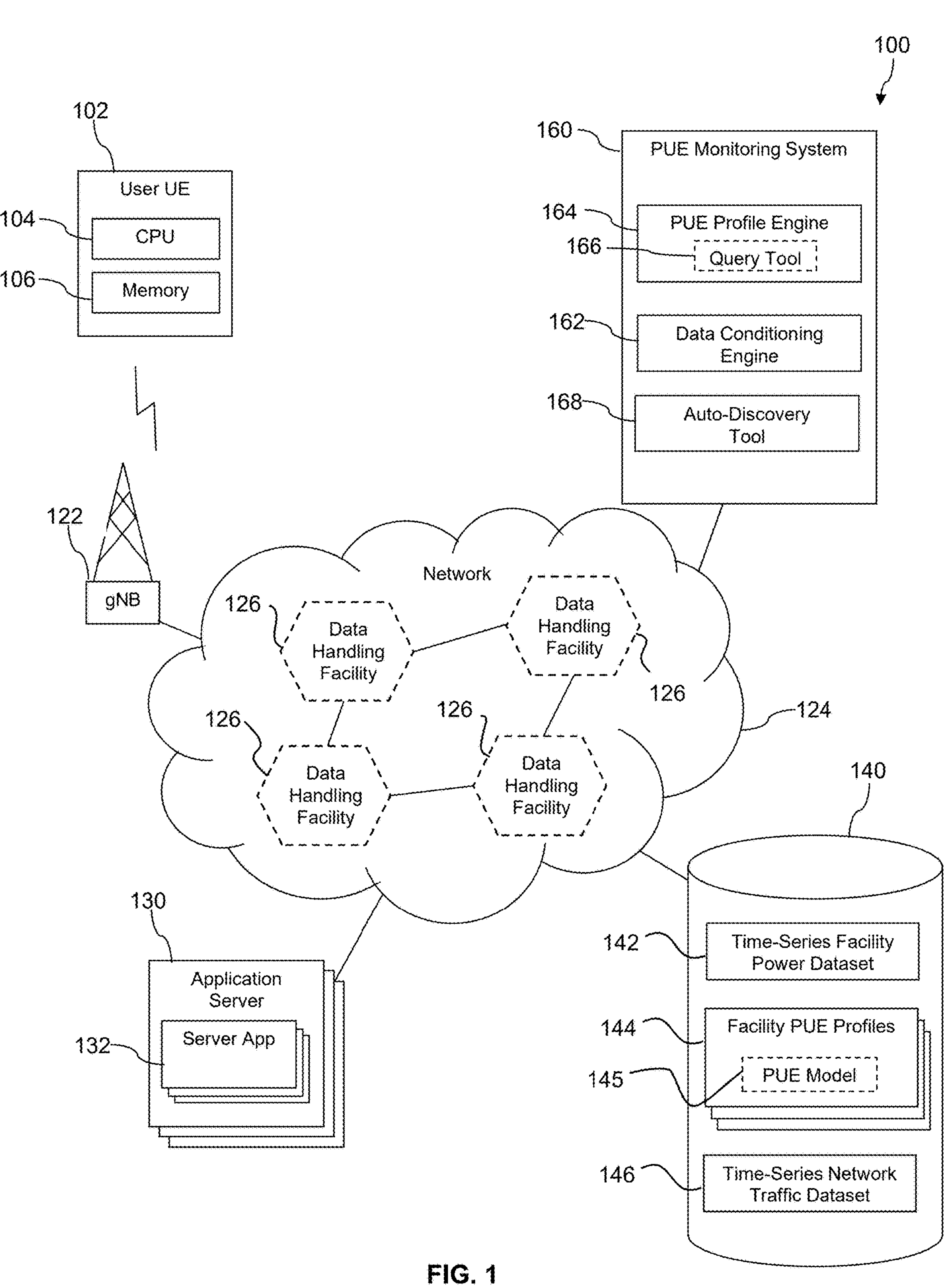
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It is understood that modern communication networks transport communication content, including voice communication, in the form of digitally encoded data. As described above, data handling facilities of communication systems form the backbone of the communication system such that data (e.g., in the form of network traffic) may be communicated across the communication system as desired by a plurality of end users of the communication system. Particularly, data handling facilities house the telecommunication equipment comprising computer systems in the form of servers, network switches, routers, datastores, and other equipment used to route data across the communication system or which otherwise facilitates the management of the communication system. As an example, telecommunication equipment may comprise modular components, including server racks, can be easily added or removed to adjust to changing requirements. In addition, data handling facilities may utilize high-density computing equipment, such as blade servers and optimized server designs, to maximize processing power within a given physical footprint. Further, efficient space utilization is achieved through techniques like virtualization and containerization.

Data handling facilities furnish the telecommunication equipment with different resources so that the hardware may operate as intended by an operator or network provider of the communication system. For example, data handling facilities include physical support structures (e.g., physical infrastructure) that provides the telecommunication equipment with the physical space required for properly housing said telecommunication equipment. For instance, data handling facilities may comprise buildings (e.g., an office building or other commercial building) in which telecommunication equipment may be housed and protected from the ambient external environment.

In addition, data handling facilities include power systems for providing the telecommunication equipment contained in the data handling facility with the electrical power required by the telecommunication equipment for its normal operation. The power system of a data handling facility may define an electrical power capacity of the data handling facility that may change over time as changes occur to the power system. Further, data handling facilities include cooling systems for maintaining the telecommunication equipment within its respective normal operating temperature ranges in spite of the often-substantial heat generated by the telecommunication equipment during normal operation. The power capacity of a data handling facility corresponds to the quantity of electrical power that may be supplied to the telecommunication equipment of the data handling facility over a selected period of time. Further, data handling facilities may include auxiliary systems as well for providing physical security for the telecommunication equipment, preventing or suppressing fires within the data handling facility, as well as for other purposes.

The various electrically powered equipment of a given data handling facility each consume various quantities of electrical power during operation of the data handling facility. For example, the telecommunication equipment of the data handling facility consumes electrical power as the telecommunication equipment handles or routes data across a communication system comprising the data handling facility. Thus, the consumption of this electrical power by the telecommunication equipment may be referred to as productive power consumption given that it is directly associated with or facilitates the routing of data across the communication system—a primary value driver of the data handling facility in its role in supporting the communication system.

Conversely, electrical power consumed for purposes that are not directly associated with or facilitates the routing of data across the communication system may be referred to as unproductive power consumption. Unproductive power consumption generally pertains to the consumption of electrical power by equipment of the data handling facility other than the telecommunication equipment thereof such as equipment configured to serve or assist the operation of the telecommunication equipment. For example, given the often significant amount of heat generated by the telecommunication equipment during operation, often a significant or even a majority of the unproductive power consumption of a data handling facility is consumed by the cooling system thereof such as mechanical cooling systems used to cool the telecommunication equipment of the data handling facility. In this manner, the cooling system indirectly, rather than directly, facilitates the routing of data across the communication system by providing an accommodating operating environment for the telecommunication equipment of the data handling facility. Similarly, auxiliary systems of a data handling facility may indirectly, rather than directly, facilitate the routing of data across a communication system by, for example, providing physical security for telecommunication equipment of the communication system.

In order to estimate how well or efficiently a selected data handling facility utilizes the power it consumes, a ratio may be estimated of the total electrical power consumption by the data handling facility over a given period of time divided by only the productive power consumption over the selected period of time. This ratio is sometimes referred to as the power utilization effectiveness (PUE) of the selected data handling facility. The PUE of a data handling facility may vary over time with an increase in the PUE of the data handling facility generally reflecting a decline in how efficiently the data handling facility utilizes the power it consumes while, conversely, a decrease in the PUE of the data handling facility generally reflecting an increase in how efficiently the data handling facility utilizes the power it consumes. In addition, a PUE of 1.0 represents a theoretical limit for data handling facilities (e.g., all electrical power consumed is done so productively) whereas the PUE of typical data handling facilities in practice is greater than 1.5 (e.g., between 1.7 and 2.3).

While PUE or "overall" PUE compares the productive power consumption of a selected data handling facility with the total or "overall" power consumption of the facility, the productive power consumption of a given data handling facility may be compared with other parameters besides total power consumption in estimating how efficiently the data handling facility utilizes the power it consumes. For example, as described above, often the primary driver of unproductive power consumption for data handling facilities is the electrical power consumed by mechanical cooling equipment (e.g., forming a cooling system of the data handling facility) of the data handling facility. Thus, the overall PUE of a given data handling facility may be estimated or approximated by estimating a ratio of the sum of the mechanical electrical power consumption and the productive power consumption of the data handling facility over a given period of time divided by only the productive power consumption over the selected period of time. This ratio may be referred to as the mechanical PUE of the selected data handling facility which, in at least some instances, may correlate with the overall PUE of the data handling facility. Given this correspondence between overall PUE and mechanical PUE, the term "PUE" as used herein is used to refer to both overall PUE and mechanical PUE interchangeably.

The PUE of a given data handling facility may be desirable to know or monitor for a variety of reasons. For example, an accurate and prompt estimate of the mechanical PUE may be used to forecast the anticipated impact of adding, removing, or otherwise altering the telecommunication equipment of the data handling facility in a manner that may alter the amount of productive power consumption of the data handling facility. For example, it may be considered, on an ad hoc basis, whether or not to add telecommunication equipment in the form of a selected number of additional servers to the data handling facility. In such a scenario, the PUE of the data handling facility may be consulted to determine whether the additional servers could result in a potential shortfall in power capacity for the data handling facility given that an increase in productive power consumption for the data handling facility will result in a corresponding increase in unproductive power consumption with the relationship between the two defined by the PUE of the data handling facility.

In another example, a communication system comprising a plurality of different data handling facilities each of which may have a unique PUE that is contingent on parameters specific to the given data handling facility such as its geographical location, the configuration and operation of its physical support structure, power system, and/or mechanical cooling systems. For instance, a first data handling facility of a communication system may generally have a lower PUE than a second data handling facility of the same communication system due to the first data handling facility being located in a more favorable, cooler geographic location, having a superior physical support structure or other factors. Given these differences, possession of accurate and timely estimates of the PUEs of the first and second data handling facilities may permit an operator of the communication system to shift telecommunication equipment (and the attendant productive power consumption) from the second data handling facility to the first data handling facility in order to minimize an overall or collective PUE for all of the data handling facilities of the communication system.

However, conventional communication systems generally are bereft of means for accurately and timely (e.g., in real-time or near real-time) estimating the PUE of the data handling facilities of the communication system, preventing an operator of the communication system from leveraging the advantages of such knowledge such as avoiding potential power capacity shortfalls and/or minimizing the overall PUE for all of the data handling facilities of the communication system. For instance, conventional communication systems may not capture the power consumed productively and unproductively by a given data handling facility, making accurate estimation of the PUE of a data handling facility impracticable. Instead, in conventional communication systems, generally an original "ballpark" or rough estimate of the PUE of a data handling facility are combined with assumptions regarding operational characteristics of the data handling facility (e.g., based on an engineering study of the initial operation of the facility), and engineering rules of thumb sometimes referred to as "safety factors" are typically relied on for selecting a "design PUE" for a given data handling facility of conventional communication systems. The design PUE of a data handling facility may not be based on data directly capturing and sorting or dividing the actual electrical power consumed productively and unproductively by the data handling facility. Instead, the design PUE may be based indirectly on assumptions based on the structural configuration of the data handling facility, operational characteristics of the data handling facility, and equipment information (e.g., supplied by the original equipment manufacturer (OEM)) pertaining to the kinds of telecommunication equipment, cooling systems, and other power consuming equipment contained in the data handling facility.

The safety factor used when estimating the design PUE for a data handling facility may take different forms. For instance, an operator may indirectly estimate a distribution of design PUEs for a selected data handling facility based on known information about the facility and may select as the design PUE a design PUE in the distribution of design PUEs that falls a predefined number of standard deviations (e.g., two standard deviations, three standard deviations) from the mean or median design PUE of the distribution. The number of standard deviations may be altered to tune the magnitude of the safety factor applied when selecting the design PUE for the data handling facility from the distribution of design PUEs. Alternatively, the safety factor may comprise a predefined multiplier applied to the design PUE of the data handling facility used to hopefully ensure the true PUE of the data handling facility is smaller (more efficient) than the design PUE of the data handling facility with the safety factor applied thereto so as to avoid potential power capacity shortfalls or other issues.

While such techniques such as the application of safety factors to the design PUE for data handling facilities may be useful in avoiding overestimating the design PUE of a given data handling facility (e.g., estimating that the PUE of the facility is lower than in reality), their application may result in a misallocation of the telecommunication equipment of a communication system between different data handling facilities thereof. For instance, an inaccurately high design PUE of a first data handling facility having a lower true PUE than of a second data handling facility may result in the shifting of telecommunication equipment from the first data handling facility to the second data handling facility (e.g., due to an inaccurately low design PUE of the second data handling facility) that would undesirably increase the overall PUE for all of the data handling facilities of the communication system. In another example, an inaccurately high design PUE of a data handling facility may result in the installation of unnecessary additional equipment for the power system of the data handling facility to increase (unnecessarily in view of the true PUE of the data handling facility) the power capacity of the data handling facility. Further, of course, inaccurate design PUEs for the different data handling facilities of a communication system may result in power capacity shortfalls and other issues due to undesirably high errors in the design PUEs for these facilities.

In summary, accurate and prompt estimations of the PUE of data handling facilities of a communication system may permit an operator of the communication system to optimize the allocation telecommunication equipment across each of the data handling facilities of the communication system, forecast changes to the operation of one or more data handling facilities in response to proposed changes to those facilities such as the alteration, addition, or removal of telecommunication equipment from the facility or other changes that could ultimately impact the amount of electrical power consumed productively and/or unproductively by the data handling facility.

In addition, accurate and timely estimations of the PUE of the different data handling facilities of a communication system may permit the operator to avoid potential power capacity or other shortfalls as changes are made (e.g., to the telecommunication equipment or other equipment) to the different data handling facilities, often on an ad hoc basis, to meet the ever changing demands of the communication system. Further, beyond forecasting the PUE of a selected data handling facility in response to a proposed change to the facility itself (e.g., the addition of telecommunication equipment in the form of additional servers and a concomitant increase in productive power consumption for the facility), operators of communication systems may leverage accurate and prompt PUE estimations to forecast potential PUEs of different data handling facilities in response to other potential changes including changes external to the facility itself such as changes in local climate or weather conditions.

As an example, an operator of a communication system may consult forecasted future weather conditions (e.g., outdoor ambient (e.g., dry bulb) temperature, relative humidity, precipitation, weather events like heat waves and the like) and apply that information to estimate the PUE of a local data handling facility should the facility experience said forecasted weather condition. This forecasted PUE for the data handling facility may also account for one or more proposed changes to the data handling facility itself whereby the operator may estimate how the altered data handling facility would perform (in terms of PUE) during the forecasted weather condition which may vary from a baseline PUE of same data handling facility when the facility is not experiencing the forecasted weather condition (e.g., when the facility is experiencing normal or baseline weather conditions). Thus, accurate and prompt PUE estimates of the data handling facilities of a communication system may be leveraged as a valuable tool by an operator of the communication system for optimizing the allocation of telecommunication equipment, avoiding potential shortfalls or other issues, and for modeling impacts to the operation of a data handling facility (e.g., impacts to its PUE over a selected future period of time) due to changes to the data handling facility (e.g., changes to its telecommunication equipment or other equipment) and/or external the data handling facility (e.g., unusual forecasted weather conditions or patterns).

Accordingly, systems and methods for estimating PUE of one or more data handling facilities of a communication system. Particularly, embodiments of PUE monitoring systems are disclosed herein configured to directly, rather than indirectly, estimate the PUE of one or more data handling facilities of a communication system based on data captured by one or more power monitors connected between electrically powered equipment of the data handling facilities. The power monitors may capture the flow of electrical power through the data handling facility over time, including the flow of electrical power through both the components of the facility that consume power unproductively (e.g., cooling system of the data handling facility) and the components of the facility that consume power productively (e.g., telecommunication equipment of the data handling facility such as servers and the like). In some embodiments, the PUE monitoring system may include an auto-discovery tool to discover automatically electrical connections between different physical nodes representing electrically powered equipment of the data handling facility.

In this manner, rather than estimating indirectly (e.g., via OEM information or other circumstantial information combined with a safety factor as part of a manually conducted engineering study), the PUE of a selected data handling facility, the PUE monitoring system may directly (and automatically in some embodiments) estimate the PUE of the facility by directly monitoring the electrical power consumed productively and unproductively over time via the power monitors of the data handling facility.

In some embodiments, the PUE monitoring system includes a Facility PUE profile engine configured to create or generate unique Facility PUE profiles for one or more data handling facilities of a communication system and which may be stored in a datastore of the communication system for retrieval by the PUE monitoring system. For example, the Facility PUE profile engine may include a query or other interface tool that permits a user of the PUE monitoring system to access desired Facility PUE profiles of the one or more data handling facilities of the communication system. Each Facility PUE profile may contain one or more PUE estimates along with other information pertaining to a selected data handling facility. For example, the Facility PUE profile may contain historical PUE of the data handling facility over time (e.g., graph illustrating PUE of the facility over a selected time period) along with a current PUE of the facility as directly estimated by the PUE monitoring system. The current PUE of the facility PUE profile may be updated at periodic intervals such as in real-time (e.g., within one second, within one minute) or near real-time (e.g., within one hour, within four hours, within twenty-four hours), or in response to other triggers such as in response to a user provided input to the PUE monitoring system. In some embodiments, the facility PUE is updated (e.g., periodically) for each day based on a predefined preceding time window such as, for example, the previous year's (the past 365 days) of data.

In some embodiments, the facility PUE profile of a given data handling facility comprises a PUE model such as a predictive model that may be dependent on the external ambient conditions at the physical location of the data handling facility. In other words, the PUE model of the PUE profile may forecast or estimate a predicted PUE for the data handling facility dependent upon the external ambient conditions such as ambient outdoor (e.g., dry bulb) temperature. In certain embodiments, climatic data is applied to the facility PUE profile such as to the PUE model thereof where the climatic data may capture climatic and weather information associated with the physical location of the data handling facility over one or more time scales including long-term timescales (e.g., climate patterns over the past 30+ years) and short-term timescales (e.g., hourly, daily, or weekly weather patterns or events). This information may be retrieved by the PUE monitoring system from an external source such as the Internet.

In certain embodiments, a user of the PUE monitoring system may interact with a selected PUE profile in order to analyze hypothetical scenarios pertaining to the data handling facility and the communication system comprising the facility. For example, a user may input a query in the form of a PUE parameter to the PUE monitoring system using the query tool thereof that may concern a hypothetical modification to the data handling facility itself (e.g., a hypothetical alteration (e.g., in terms of structural configuration or manner of operation) to at least one of an equipment feature and an operating environment feature of the data handling facility. Particularly, the PUE parameter contained in the user-provided query may correspond to an equipment feature of the data handling facility or an operating environment feature of the data handling facility.

The equipment feature of the PUE parameter may pertain, for example, to any of the telecommunication equipment, power system equipment, and cooling system equipment of the data handling facility with respect to structural or physical changes to the equipment (e.g., replacement of equipment, refurbishment of equipment, addition or subtraction of equipment) or proposed changes to the manner in which the equipment is operated (e.g., the external loads applied to the equipment of the data handling facility during operation thereof such as networking loads). The operating environment feature of the PUE may conversely pertain to the operating environment of the data handling facility. For example, the operating environment feature may comprise a user-defined future date whereby the predicted PUE corresponds to a predicted PUE of the data handling facility on the future date. In another example, the operating environment feature may comprise a user-defined ambient weather conditions (e.g., outdoor ambient temperature, pressure, humidity, precipitation) associated with a physical location of the data handling facility whereby the predicted PUE corresponds to a predicted PUE of the first data handling facility as the first data handling facility encounters the ambient weather conditions.

In this manner, for instance, the user may submit a query forecasting a specified change to the data handling facility itself or its external environment whereby the PUE monitoring system, using the PUE profile of the selected data handling facility, provides the user automatically with a predicted PUE for the data handling facility should the hypothetical parameters contained in the query prevail. Such information could be used as a tool by the user for both short-term infrastructural projects (e.g., temporarily shifting telecommunication equipment between data handling facilities) as well as long-term projects (e.g., analyzing the long-term impact of climate change to the PUEs of the one or more data handling facilities and the communication system as a whole).

In some embodiments, a single query provided by the user to the PUE monitoring system may address a plurality of separate data handling facilities whereby hypothetical changes (elaborated in the query) to the PUEs of the separate data handling facilities may be analyzed. For example, the query tool may analyze and provide answers to the question "can the collective data throughput of data handling facilities X, Y, and Z be increased to handle an aggregate 10% data volume increase, given the respective PUE profiles and the respective current power capacities of facilities X, Y, and Z?" The query tool may further provide a proposed solution to the query if the general answer is "Yes." For example, the query tool may propose shifting a first type of traffic away from facility X to facility Y, shifting some of a second type of traffic from facility Z to facility X, increasing the power distribution equipment and/or the air conditioning equipment at facility Z, with the ultimate result of these adaptations being an overall 10% increase of data volume across facilities X, Y, and Z without running afoul the respective PUE profiles (e.g., calling for a PUE for facility X that is inconsistent with the PUE profile of facility X) of facilities X, Y, and Z.

A hypothetical modification to a selected data handling facility contained in a query submitted by a user to the PUE monitoring system may be a deliberate modification (e.g., what would be the impact to the PUE, productive, and/or unproductive power consumption of the data handling facility if new servers or other telecommunication equipment were added) or incidental (e.g., what would be the operational impact PUE, productive, and/or unproductive power consumption of the data handling facility if a piece of equipment of the power supply or cooling systems were to inadvertently go offline for an extended period of time). Thus, the PUE monitoring system may be used to both optimize the efficiency and performance of the different data handling facilities of the communication system (e.g., to minimize a global PUE of the communication system) and analyze the robustness of different data handling facilities forming a communication system.

To provide a specific example, it may be desired to swiftly (e.g., within a few weeks or months) increase the data throughput of a selected data handling facility in order to better serve end users of the communication system such as a result of a failure or other issue at a separate data handling facility of the communication system. However, a heat wave may be forecasted to occur during the same period of time at the location of the selected data handling facility, where the heat wave may impact the PUE of the selected data handling facility and thus the suitability of the facility for increasing data throughput during the selected time period.

In such a scenario, a user may use the query tool to apply the forecasted heat wave information to the PUE profile of the selected data handling facility whereby the PUE monitoring system may automatically provide the user with a hypothetical PUE for the selected data handling facility during the selected time period should the forecasted heat wave prevail. The user may compare this hypothetical, "heat wave PUE" for the data handling facility and compare it with other information pertaining to the facility such as its power capacity and determine the suitability of increasing the data throughput for the selected data handling facility during the selected time period.

For instance, the predicted heat wave PUE may, when combined with the forecasted productive power consumption for the data handling facility during the selected time period, indicate to the user a shortfall in power capacity for the facility during the selected time period whereby the user may brainstorm alternative solutions and avoid a potential power disruption at the selected data handling facility (e.g., as a result of mistakenly increasing the data throughput during the selected time period). In some embodiments, the PUE profile of a selected data handling facility may contain information relating to its current and/or historical power capacity and other parameters whereby the PUE monitoring system may automatically forecast the potential power shortfall based on the heat wave PUE.

As an example, in certain embodiments, an operator of a communication system comprising a plurality of data handling facilities may, for example, reallocate at least one of telecommunication equipment, power system equipment, and cooling system equipment between the different data handling facilities based on estimated PUEs for the data handling facilities provided by the PUE monitoring system. This analysis may also focus on the impacts of climate change to the different data handling facilities by observing how the estimated PUEs for the different data handling facilities project into the future as environmental conditions change. In this manner, strategic decisions regarding the abandonment of some of the data handling facilities (e.g., due to an undesirably high projected PUE), the allocation of equipment between the facilities, and the construction of new data handling facilities over time can be made more accurately.

Turning to FIG. 1, a communication system 100 is described. In an embodiment, the communication system 100 generally includes a user electronic device (user equipment—UE) 102, an access node 122, a network 124, an application server 130, a datastore 140, and an PUE monitoring system 160. It may be understood that in at least some embodiments the PUE monitoring system 160 is implemented as one or more software applications executing on a computer system. UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 124 such as an enterprise, organization, or individual.

The access node 122 of communication system 100 may provide communication coupling the UE 102 to the network 124 according to a 5G protocol, for example 5G, 5G New Radio, or 5G LTE radio communication protocols. The access node 122 may provide communication coupling the UE 102 to the network 124 according to a long term evolution (LTE), a code division multiple access (CDMA), and/or a global system for mobile communication (GSM) radio communication protocol. The access node 122 may be referred to for some contexts as a gigabit Node B (gNB), an enhanced Node B (eNB), a cell site, or a cell tower. Additionally, while not shown, UE 102 may be communicatively coupled to the network 124 via a WiFi access point or another non-cellular radio device. Further, while a single access node 122 is illustrated in FIG. 1, it is understood that communication system 100 may comprise any number of access nodes 122.

Network 124 comprises a plurality of interconnected data handling facilities 126 that form or define the backbone of the network 124 (with access nodes 122 forming the skin of the network 124) and which direct network traffic (e.g., traffic generated by UE 102 and/or application server 130) across the network 124 to its intended destination. Data handling facilities 126 thus include the telecommunication equipment required for directing network traffic including network servers, routers, and switches, along with equipment necessary for supporting the telecommunication equipment such as a power system for supplying adequate power to the telecommunication equipment and a cooling system for cooling the telecommunication equipment such that it may remain within a desired operational temperature range.

The network 124 of communication system 100 may comprise one or more public networks, one or more private networks, or a combination thereof. For example, network 124 may comprise a core network, such as a 5G core network. Further details of 5G networks are discussed below with reference to FIGS. 7A and 7B. While shown as communicatively coupled to the network 124, application server 130, datastore 140, and PUE monitoring system 160 may be considered part of network 124 and are illustrated as separate from network 124 in FIG. 1 to promote discussing their roles with respect to UE 102, as will be discussed further herein. Additionally, although in FIG. 1 network 124 is shown as including only a single datastore 140 and application server 130, it may be understood that network 124 may include varying numbers of datastores and servers.

UE 102 includes a processor or CPU 104 and a memory 106 in signal communication with the processor 104. UE 102 may access various resources of network 124 through the access node 122. For example, users of UE 102 may transmit information from UE 102 to the network 124 through the access node 122 and save the transmitted information on the network 124, such as on datastore 140. In addition, UE 102 may access at least some of the resources of the application server 130, where application server 130 may include one or more server applications 132. Server applications 132 may provide one or more services or features accessible by the user through UE 102.

The datastore 140 of communication system 100 includes a time-series network a time-series facility power dataset 142 and one or more Facility PUE profiles 144 corresponding to the data handling facilities 126 of network 124. Facility power dataset 142 comprises time-series data of the flow of electrical power through the data handling facilities 126 over time. In some embodiments, facility power dataset 142 has a granularity sufficient to capture the flow of electrical power through the different electrically powered equipment of a given data handling facility 126. For example, in certain embodiments, the data forming facility power dataset 142 is collected by a plurality of power monitors of a data handling facility at a circuit level thereof such that the various electrically powered circuits of the data handling facility are separated into a productive power consumption circuit and a unproductive power consumption circuit that is separate from the productive power consumption circuit.

In some embodiments, the productive and/or unproductive power consumption circuits of a selected data handling facility may be represented or modeled graphically, e.g., as part of an ontology or power map of the data handling facility which may be stored as a dataset (e.g., comprising a plurality of separate power maps for a corresponding set of data handling facilities) in the datastore 140 of communication system 100. For instance, a power map of a data handling facility may illustrate schematically (e.g., in the form of a knowledge graph, a block diagram, a flow chart) a productive power consumption circuit including productive power consuming equipment (e.g., telecommunication equipment of the data handling facility) represented as nodes and connected together by lines or edges. In addition, the power map may illustrate schematically an unproductive power consumption circuit (e.g., presented together with the productive power consumption circuit, as a separate layer from the productive power consumption circuit) including unproductive power consuming equipment (e.g., cooling system equipment of the data handling facility) similarly represented as nodes and connected together by lines or edges.

The electrically powered equipment of a data handling facility may comprise components of a power system (e.g., a switchgear, a circuit breaker, a panel, a transformer, a rectifier) of the data handling facility 126, a cooling system (e.g., a fan or blower, an evaporator, a condenser, a chiller) of the data handling facility 126, and/or telecommunication equipment of the data handling facility such as, for example, network servers, routers, and switches. Facility power dataset 142 may be captured in real-time or near real-time by a plurality of electrical power monitors or power sensors of the different data handling facilities 126 forming network 124, as will be discussed further herein.

The facility PUE profiles 144 of datastore 140 are generated by the PUE monitoring system 160 of communication system 100 and each contain historical and/or current PUE for a given data handling facility based on the facility power dataset 142 such as the facility power data specific to the given data handling facility. In certain embodiments, at least some of the facility PUE profiles 144 are each specific to a unique data handling facility 126 while other facility PUE profiles 144 may correspond to a plurality or group of data handling facilities 126. In certain embodiments, some of the facility PUE profiles 144 may correspond to different systems of a selected data handling facility 126. Further, in some embodiments, facility PUE profiles 144 map the facility power dataset 142 into topologies that may be selectably interrogated by users of the PUE monitoring system 160. In some embodiments, facility PUE profiles 144 may be constructed from both the facility power dataset 142 and the network traffic dataset 146 of datastore 140.

In some embodiments, each facility PUE profile 144 comprises a PUE model 145 specific to its corresponding data handling facility. The estimated future PUE of the data handling facility may be based on historical (e.g., indenting trends in the historical data) and/or current PUE of the facility as estimated by PUE monitoring system 160, as well as additional information such as, for example, historical/current productive power consumption of the facility, historical/current unproductive power consumption of the facility, historical/current data throughput of the facility, and information relating to the surrounding environment such as long-term weather or climatic trends in the local area. PUE monitoring system 160 may be configured to automatically access such information relating to the surrounding environment from one or more external sources accessible via communication system 100 using, for example, an application programming interface (API).

In some embodiments, PUE model 145 may be used by PUE monitoring system 160 to estimate hypothetical, future, or projected PUEs for a selected data handling facility. For instance, the PUE model 145 may be used to estimate by the PUE monitoring system 160 a hypothetical PUE of the corresponding data handling facility should certain conditions or parameters (e.g., defined by a user of system 160) prevail at the data handling facility. Alternatively, PUE model 145 may be used by PUE monitoring system 160 to estimate a future or projected PUE for a selected period of time extending from a first point in time chronologically equal to or following the present to a second point in time that chronologically follows the first point in time.

In some embodiments, each PUE model 145 of each corresponding data handling facility 126 comprises a predictive model such as, for example, a regression model, a forecast model, a time series model, and the like configured to predict or estimate a predicted PUE (e.g., based on a user query containing a user-defined PUE parameter) of the data handling facility 126 based on the facility power dataset 142 specific to the data handling facility 126, contextual data not necessarily linked to the physical structure or equipment of the facility 126 such as current and historical trends (e.g., one year trend, five year trend, ten year trend) in ambient outdoor temperature or other weather or climatic data. In certain embodiments, the predictive model of each PUE model 145 includes a machine learning (ML) or deep learning (DL) algorithm such as, for example, a regression algorithm (e.g., a linear regression algorithm), a decision-based algorithm such as a random forest algorithm or a gradient boosted algorithm.

In some embodiments, PUE monitoring system 160 (e.g., PUE profile engine 164) comprises a PUE model training module or engine configured to train PUE model 145 in embodiments in which PUE model 145 comprises a predictive model including a ML or DL algorithm that must be initially trained using a training dataset before being deployed into operation. For example, the PUE model training module may apply historical data captured from facility power dataset 142 as well as contextual data such as trends in local ambient conditions (e.g., trends in ambient outdoor temperature like dry bulb temperature) for the data handling facilities 126 that is correlated (e.g., via data conditioning engine 162) with the facility power dataset 142. Thus, in some embodiments, the facility power dataset 142 along with additional information such as trends in local ambient conditions like dry bulb temperature comprise the training dataset used to train the predictive models of PUE models 145. In some embodiments, the training dataset used to train a given predictive model of a PUE model 145 may include data associated with data handling facilities other than the data handling facility associated with the PUE model 145 to enhance the accuracy and predictiveness of the PUE model 145.

In this manner, a user of PUE monitoring system 160 may, via PUE model 145, project the PUE of a selected data handling facility years into the future to monitor long-term trends in the facility's PUE driven by various factors internal and external to the data handling facility 126. For example, a user of PUE monitoring system 160 may project the PUEs of various data handling facilities in an effort to "climate proof" said facilities or the overarching communication system itself from the effects of long-term climate change. Said climate proofing may be particularly important in this context considering that different data handling facilities positioned in different locations may be impacted differently by climate change.

In some embodiments, datastore 140 additionally includes a network traffic dataset 146 that includes time-series data of network throughput and/or bandwidth associated with the plurality of data handling facilities 126 of network 124. For example, network traffic dataset 146 may indicate the network load applied to one or more selected data handling facilities 126 over a selected time period (e.g., the amount of network data routed by a selected facility 126 over the selected time period).

Network traffic dataset 146 may be used to monitor the flow of network traffic over time through the different data handling facilities 126 forming the network 124. In some embodiments, network traffic dataset 146 is specific to a given data handling facility such that the network throughput through a selected data handling facility 126 may be monitored over time. In certain embodiments, network traffic dataset 146 may be specific to particular telecommunication equipment (e.g., a selected server rack, a selected network server) of a selected data handling facility 126. Network traffic dataset 146 may be captured by one or more network traffic monitoring tools of network 124 in real-time (e.g., with a latency of one minute or less, one second or less) or near real-time (e.g., updated periodically such as hourly, daily, weekly).

The PUE monitoring system 160 of communication system 100 is configured to generate the facility PUE profiles 144 stored in datastore 140 as well as to manage or interrogate (e.g., at the behest of a user of PUE monitoring system 160) the facility PUE profiles 144 to gain insight to the operation (or proposed future operation) of the network 124. In this exemplary embodiment, PUE monitoring system 160 includes a data conditioning engine 162 and a PUE profile engine 164 including an interrogation or query tool 166.

In certain embodiments, PUE monitoring system 160 also comprises an auto-discovery tool 168 that discovers automatically the physical connections between electrically powered equipment of data handling facilities 126 based on the facility power dataset 142. In some embodiments, PUE monitoring system 160 discovers automatically the physical connections (e.g., electrical physical connections) between electrically powered equipment (e.g., components of power systems, cooling systems, telecommunication equipment) of data handling facilities 126 using only information gleaned or sourced from the facility power dataset 142, and thus may not make use of other sources of information such as engineering drawings that may be incorrect or incomplete. The physical connections discovered by the auto-discovery tool 168 may be captured in the facility PUE profiles 144 stored in datastore 140.

The PUE profile engine 164 of PUE monitoring system 160 automatically generates and manages the facility PUE profiles 144 stored in datastore 140 using the physical connections discovered by the auto-discovery tool 168 and the facility power dataset 142. In some embodiments, PUE profile engine 164 automatically generates and manages the facility PUE profiles 144 stored in datastore 140 using the physical connections discovered by the auto-discovery tool 168 and the facility power dataset 142.

The facility PUE profiles 144 generated by PUE profile engine 164 capture more than the physical connections between electrically powered equipment of data handling facilities 126. Particularly, PUE profile engine 164 builds or interleaves additional ontology layers onto the physical ontology mapped out by the auto-discovery tool 168. These additional ontology layers pertain to the infrastructure of the data handling facilities 126 (e.g., mapping out the relationship between different floors, rooms, and other infrastructural components of a data handling facility 126 with electrically powered equipment thereof). Additionally, PUE profile engine 164 may generate additional ontology layers such as a logical ontology layer defining logical relationships between different components (e.g., infrastructural components, electrically powered equipment, systems or subsystems) of the data handling facilities 126 which may be leveraged using the query tool 166 of PUE profile engine 164 to gain greater insight to the operation of the different data handling facilities 126 of network 124.

The data conditioning engine 162 conditions or filters raw facility power data generated by the power monitors of data handling facilities 126 to filter or remove noise or other undesirable artifacts and spurious data present in the raw facility power data. This filtering of removal of noise and other artifacts or spurious data performed by data conditioning engine 162 comprises producing conditioned or filtered facility power data (stored in datastore 140 as facility power dataset 142 in some embodiments) from which the PUE profile engine 164 of PUE monitoring system 160 may generate facility PUE profiles 144.

For instance, rapid changes in the raw facility power data generated by the power monitors may be indicative of spurious data such as an error in the operation of the power monitor rather than an accurate reflection of the respective power level monitored by the power monitor. Therefore, in some embodiments, data conditioning engine 162 comprises a low-pass filter configured to filter out rapid changes in the raw facility power data generated by the power monitors.

The low-pass filter of data conditioning engine 162 may take many forms. As but one example, in an embodiment, raw facility power data may be collected at a first or raw sampling rate (e.g., every minute, every five minutes, every fifteen minutes) whereas the filtered facility power data produced by data conditioning engine 162 is at a second sample rate that is less frequent (e.g., every half hour, every hour, every four hours) than the first sample rate.

In this arrangement, each filtered facility power datapoint represents or incorporates several raw facility datapoints which may be combined (e.g., averaged) to produce the single corresponding filtered facility power datapoint to thereby smooth out any outlying raw facility power datapoints that may be spurious. For instance, a filtered facility power dataset with a sampling rate of one hour has a plurality of datapoints each combining four separate datapoints from a corresponding raw facility power dataset with a sampling rate of fifteen minutes. In this example, each raw facility power datapoint is accorded only a quarter of the weight in the filtered facility power dataset, thereby smoothing out outlying datapoints. Additionally, in this example, the first and second sampling rates may be adjusted to tune the responsiveness and sensitivity of the low-pass filter of data conditioning engine 162.

In addition to filtering the raw facility power data received from the various power monitors of a data handling facility, data conditioning engine 162 may perform additional operations on the raw and/or filtered facility power data. For instance, data conditioning engine 162 may automatically label the various streams of power data received from the different power monitors of the data handling facility 126. In some embodiments, the auto-discovery tool 168 of PUE monitoring system 160 may assist or facilitate the auto-labeling of the streams of power data received from the power monitors of the data handling facility. Further, data conditioning engine 162 may logically aggregate the streams of power data received from the different power monitors of the data handling facility 126 such that the aggregated data is organized and presented to the PUE profile engine 164 in a form that permits engine 164 to create facility PUE profiles 144 from the filtered and aggregated facility power data contained in facility power dataset 142.

In some embodiments, using the facility power dataset 142, PUE profile engine 164 may additionally automatically classify or label the different electrically powered equipment of a given data handling facility in accordance with a predefined taxonomy. The taxonomy may include different classifications of electrically powered equipment of data handling facilities 126. For example, the classifications of the predefined taxonomy may include electrical transformers, electrical switching devices, electrical panels or subpanels, electrical rectifiers, air conditioner compressor motors, air conditioner fan motors, server racks, and the like. For instance, based on a substantial change in electrical voltage across a given electrically powered component of a data handling facility 126, the PUE profile engine 164 may infer the component is an electrical transformer having capabilities defined by the monitored flow of electrical power into and from the electrical transformer documented in the facility power dataset 142. In this manner, the different electrically powered equipment of data handling facilities 126 may be classified automatically without needing to rely on other sources of information such as engineering drawings that may be inaccurate, outdated, and/or incomplete.

In some embodiments, PUE profile engine 164 may also divide the labeled electrically powered equipment of the data handling facility 126 and the corresponding facility power dataset 142 into a first group or productive power consumption circuit and a separate second group or nonproductive power consumption circuit. The productive and nonproductive power consumption circuits or the information contained therein may be contained in the facility PUE profile 144 of the given data handling facility 126. For example, in some embodiments, the electrically powered equipment defining the productive and nonproductive power consumption circuits of a data handling facility may be represented graphically as part of a topology or map of the data handling facility that may be incorporated into the facility PUE profile 144 of the given data handling facility 126.

The query tool 166 of PUE profile engine 164 permits users of PUE monitoring system 160 to query or interrogate the facility PUE profiles 144 generated by the PUE profile engine 164. For example, a user may use the query tool 166 to correlate network traffic with power consumption within a given data handling facility 126 to gain greater insight into the operation of the data handling facility 126 such as how much excess network bandwidth, power capacity, and/or cooling capacity (inferred by the consumption of electrical power by a cooling system of the data handling facility 126) the data handling facility 126 may have during normal operation of the network 124.

Query tool 166 may also be used to forecast (via the PUE profile engine 164) the impact of hypothetical modifications to one or more of the data handling facilities 126 on the operation of the data handling facilities 126. For example, query tool 166 may include a user-defined PUE parameter that is inputted to the PUE profile engine 164 in forecasting the predicted PUE. The PUE parameter may comprise at least one of an equipment feature and an operating environment feature of the data handling facility 126. As another example, query tool 166 may be used to study the impact of modifying the power system and/or cooling system of a given data handling facility 126 on the operation of telecommunication equipment of the data handling facility 126 (e.g., how much additional cooling capacity would be added by providing a cooling system of a data handling facility 126 with an additional air handler).

An equipment feature of the user-inputted PUE parameter may pertain, for example, to alterations to any of the telecommunication equipment, power system equipment, and cooling system equipment of the data handling facility 126. For example, the PUE parameter may pertain to the addition of server racks (or other telecommunication equipment) to a given data handling facility 126 with the PUE profile engine 164 determining whether a power or cooling shortfall would occur at the data handling facility 126 in response to the addition of the server racks.

An operating environment feature of the user query may instead comprise a user-defined future date whereby the predicted PUE corresponds to a predicted PUE of the data handling facility on the future date. In another example, the operating environment feature may comprise one or more user-defined ambient weather conditions (e.g., outdoor ambient temperature, pressure, humidity, precipitation) associated with a physical location of the data handling facility whereby the predicted PUE corresponds to a predicted PUE of the first data handling facility as the first data handling facility encounters the ambient weather conditions. In this manner, the PUE profile engine 164 may leverage climatic data (e.g., used to train a PUE model 145) to allow users of PUE monitoring system 160 to project the PUEs of different data handling facilities 126 years or decades into the future as local climatic conditions change at the physical locations associated with the data handling facilities 126.

Figure 2:
FIG. 2 is a schematic diagram of a data handling facility according to an embodiment of the disclosure.
Figure 2:
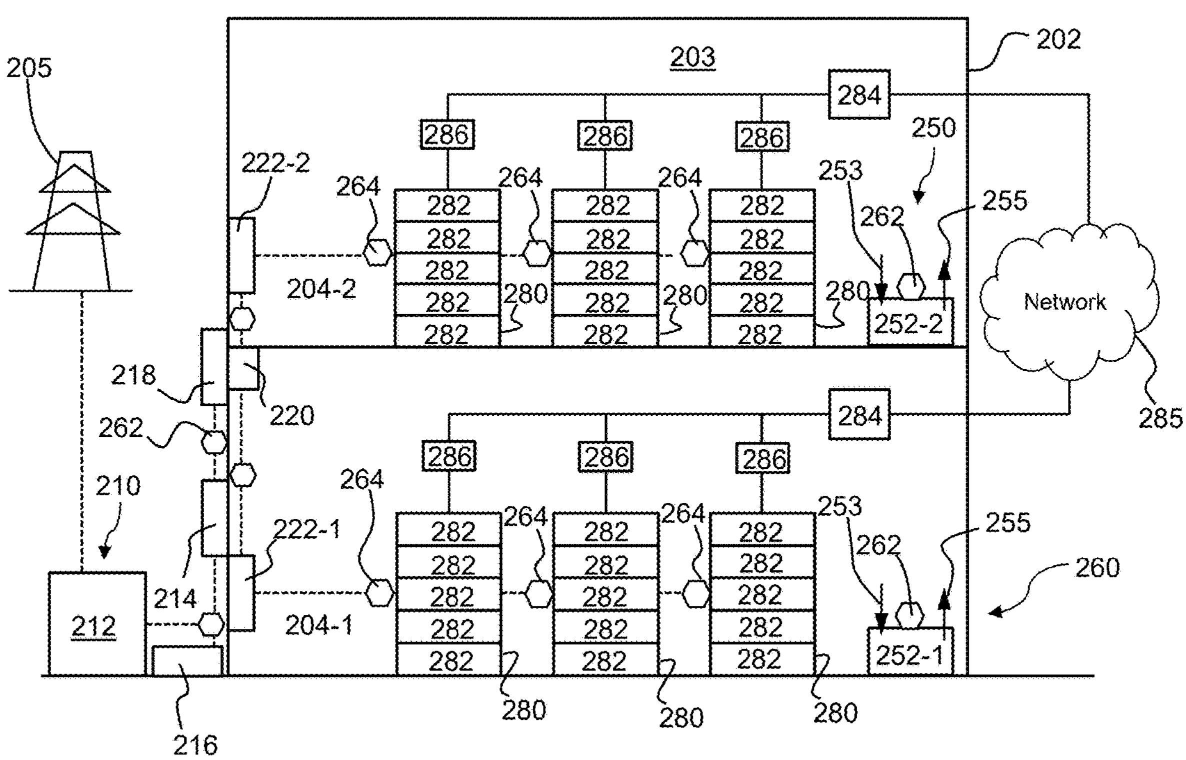

Referring now to FIG. 2, an exemplary data handling facility 200 is illustrated schematically according to some embodiments. Particularly, data handling facility 200 includes a physical infrastructure 202, a power delivery or simply "power" system 210, a cooling system 250, and a power monitoring system 260. In this exemplary embodiment, the physical infrastructure 202 of data handling facility 200 is in the form of a stationary building (and thus infrastructure 202 is also referred to herein as building 202) having a relatively fixed space capacity that is divided between a first floor 204-1 and a second floor 204-2 located vertically above the first floor 204-1. The configuration of physical infrastructure 202 may vary in other embodiments and thus building 202 serves only as one example of how the physical infrastructure of a given data handling facility may manifest. For example, in other embodiments, building 202 may comprise a single floor 204 or more than two floors 204. In still other embodiments, physical infrastructure 202 may not comprise a stationary building having a relatively fixed physical space capacity and instead may comprise a mobile and/or modular infrastructure.

Data handling facility 200 additionally includes telecommunication equipment that is divided between floors 204-1 and 204-2. Particularly, on each floor 204 is positioned a plurality of sever racks 280 each comprising a plurality of network servers 282 (e.g., blade servers). Network servers 282 may be implemented as computer systems. Computer systems are described further herein. In addition, the telecommunication equipment of data handling facility 200 includes one or more routers 284 and one or more network switches 286 connected between the network routers 284 and the server racks 280. Network routers 284 of data handling facility 200 are connected to a network 285 (e.g., network 124 illustrated in FIG. 1). For example, network routers 284 of data handling facility 200 may be connected with the telecommunication equipment of other data handling facilities 200 where a plurality of interconnected data handling facilities 200 at least partially collectively form the backbone or core of the network 285 for directing network traffic therealong.

Network servers 282 of the server racks 280 of data handling facility 200 facilitate various functionalities and features of the network 285. Network servers 282 are connected to the larger network 285 through the network routers 284 of data handling facility 200. Additionally, individual server racks 280 may be selectably isolated from the network 285 via the operation of network switches 286. In some embodiments, individual network servers 282 of a selected server rack 280 may be isolated from the network 285 via the operation of one or more network switches 286.

In some embodiments, one or more network servers 282 may comprise application servers hosting one or more server applications (e.g., application servers 130 hosting server applications 132 illustrated in FIG. 1). One or more of network servers 282 may be responsible for properly routing network traffic to ensure users of the network 285 may access desired features hosted on the network 285. Further, one or more network servers 282 may comprise data servers hosting one or more datastores (e.g., datastore 140 illustrated in FIG. 1) of the network 285. Although in this exemplary embodiment the telecommunication equipment of data handling facility 200 includes server racks 280, network routers 284, and network switches 286, the composition and/or configuration of the telecommunication equipment may vary in other embodiments from that shown in FIG. 2. For example, in other embodiments, the telecommunication equipment of data handling facility 200 may include sensor arrays, data acquisition systems, control architecture, and other computer-implemented hardware.

The telecommunication equipment (e.g., server racks 280, network routers 284, and network switches 286) consume electrical power in order to perform their intended functions, said electrical power being delivered to the telecommunication equipment by the power system 210 of data handling facility 200. In this exemplary embodiment, power system 210 of data handing facility 200 generally includes an electrical transformer 212, a switchgear 214, an electrical generator 216, an uninterruptible power supply (UPS) 218, a power distribution unit (PDU) 220, and one or more power supplies 222.

The transformer 212 of power system 210 receives high voltage alternating current (HV-AC) electrical power from an electrical grid 205 connected therewith. Transformer 212 serves to reduce or "step down" the AC voltage of the HV-AC used to transmit the electrical power through the electrical grid 205 (e.g., to minimize transmission losses) to a lesser voltage that may be safely and conveniently handled by the components of power system 210. The stepped down AC voltage electrical power is outputted by the transformer 212 and transferred to the switchgear 214 which, in this exemplary embodiment, comprises an AC switchgear. Switchgears such as switchgear 214 comprise electrical switching devices configured to distribute electrical power to a plurality of selectable outputs from a single electrical power input received by the electrical switching device. Electrical switching devices such as switchgears (a high-voltage electrical switching device) typically include electrical busses or busbars, switches, circuit breakers, fuses, and the like.

In addition to transformer 212, electrical generator 216 is also connected to switchgear 214. Particularly, in this exemplary embodiment, electrical generator 216 is configured to produce electrical power (e.g., AC electrical power) that is deliverable to the switchgear 214. For example, electrical generator 216 may include an engine powered by a fuel source (e.g., natural gas) for selectably driving the operation of electrical generator 216. Thus, in this exemplary embodiment, switchgear 214 may receive electrical power from electrical grid 205 (via the transformer 212) and/or from electrical generator 216. In other embodiments, power system 210 may not include electrical generator 216 with electrical grid 205 being the only source of electrical power for data handling facility 200. In still other embodiments, data handling facility 200 may be provisioned with additional sources of electrical power such as a solar array and the like.

Switchgear 214 serves as an electrical switching device for electrically isolating data handling facility 200 from the sources of electrical power (electrical grid 205 and electrical generator 216 in this exemplary embodiment) configured to supply data handling facility 200 with electrical power. Thus, by operating switchgear 214, data handling facility 200, including the telecommunication equipment thereof, may be electrically isolated from the electrical grid 205.

The UPS 218 receives electrical power from the switchgear 214 when the switchgear 214 is in a "closed" state electrically connecting the UPS 218 with the transformer 212 and electrical generator 216. UPS 218 is generally configured to provide a reliable, uninterrupted flow of electrical power to the telecommunication equipment (e.g., server racks 280, network routers 284, and network switches 286) of data handling facility 200. Additionally, UPS 218 provides an uninterrupted flow of electrical power to the cooling system 250 of data handling facility 200. In some embodiments, UPS 218 is configured to store backup electrical power (e.g., via batteries of the UPS 218) for providing the data handling facility 200 with electrical power in the event that the normal sources of electrical power (e.g., electrical grid 205 and/or electrical generator 216) become unavailable so that the distribution of power to the telecommunication equipment and/or cooling system 250 of data handling facility 200 is not interrupted. However, UPS 218 may only store a finite amount of electrical power and thus continued operation of the electrically powered equipment of data handling facility 200 is contingent upon one of the normal sources of electrical power for data handling facility 200 being restored before the backup power supplied by UPS 218 has been consumed.

The PDU 220 of power system 210 distributes electrical power received from the UPS 218 of power system 210 to various electrically powered equipment of data handling facility 200. In this exemplary embodiment, PDU 220 distributes AC electrical power to a pair of power supplies 222-1, 222-2, and the cooling system 250 of data handling facility 200. Power supplies 222-1 and 222-2 of power system 210 convert the AC electrical power received thereby from PDU 220 into DC electrical power that is supplied to the telecommunication equipment (e.g., server racks 280, network routers 284, and network switches 286) of data handling facility 200.

In this exemplary embodiment, each floor 204-1 and 204-2 of building 202 is provided with its own power supply 222-1 and 222-2, respectively, for powering the telecommunication equipment located on the given floor 204-1 and 204-2. However, the composition and configuration of the components of power system 210 may vary in other embodiments. For example, in other embodiments, a single power supply 222 may power the telecommunication equipment for both floors 204-1 and 204-2. In other embodiments, each server rack 280 may have its own unique power supply 222. In still other embodiments, power system 210 may not include electrical generator 216 and/or UPS 218.

Further, power system 210 comprises an AC power system in this exemplary embodiment such that the AC electrical power received by power system 210 is only converted to DC electrical power at the last instance when the electrical power is supplied to the DC electrically powered equipment of data handling facility 200. However, in other embodiments, power system 210 may comprise a DC power system including a DC rectifier positioned between the given power source (e.g., electrical grid 205) and the switchgear for converting the AC electrical power received from the power source into DC electrical power upstream of the switchgear. In this configuration, the switchgear would receive DC electrical power from the DC rectifier. At least some of the network switches 286 and network routers 284 may receive DC electrical power.

During operation of data handling facility 200, the telecommunication equipment (e.g., server racks 280, network routers 284, and network switches 286) thereof may consume substantial amounts of electrical power supplied by the power system 210. At least a portion of the electrical power consumed by the telecommunication equipment of data handling facility 200 is converted into thermal energy that radiates from the telecommunication equipment through an interior 203 of the building 202 of data handling facility 200.

Given that the telecommunication equipment of data handling facility 200 may consume substantial amounts of electrical power, the telecommunication equipment may similarly generate substantial amounts of heat during the operation of data handling facility 200. Indeed, the heat generated by the telecommunication equipment may, without adequate cooling, lead to overheating (e.g., operate at a temperature falling outside of an operational temperature range of the hardware) of at least some of the telecommunication equipment such that the hardware may be at risk of incurring damage or otherwise at risk of not performing as intended. Cooling system 250 of data handling facility 200 thus provides cooling to the interior 203 of building 202 sufficient to adequately cool the telecommunication equipment located therein and prevent the telecommunication equipment from overheating.

In this exemplary embodiment, cooling system 250 is configured to implement a closed-loop refrigeration cycle in which heat (e.g., heat generated by the server racks 280, network routers 284, and network switches 286 of data handling facility 200) is pumped from the interior 203 of building 202 to the ambient environment surrounding the building 202. Particularly, in this exemplary embodiment, cooling system 250 includes a pair of computer room air conditioning (CRAC) units 252-1 and 252-2 divided between the floors 204-1 and 204-2 of building 202. Each CRAC unit 252-1 and 252-2 comprises an evaporator fluidically coupled with a condenser or cooler that is external the building 202. In this configuration, each CRAC unit 252-1/252-2 receives a stream of hot air 253 that is cooled by the evaporator of the CRAC unit 252-1/252-2 and rejected from the CRAC unit 252-1/252-2 as cooled air 255. Particularly, heat from the hot air 253 is transferred to coolant circulating through the evaporator and which may be pumped to a condenser located external the building 202 where the heat is transferred from the condenser to the ambient air of the external environment.

While in this exemplary embodiment cooling system 250 is configured to implement a closed-loop, mechanical refrigeration cycle, the configuration of cooling system 250 may vary in other embodiments. For example, in some embodiments, cooling system 250 may include one or more computer room air handlers (CRAHs) that do not make use of mechanical refrigeration.

Each CRAC unit 252-1/252-2 may have a corresponding cooling capacity (e.g., measured in kWs) that is contingent on the configuration (e.g., the size of the evaporator, blower, and/or condenser, the volume or type of refrigerant, and other factors) of the respective CRAC unit 252-1/252-2. In addition to a cooling capacity, each CRAC unit 252-1/252-2 may have a corresponding efficiency based on the configuration of the respective CRAC unit 252-1/252-2 that relates the amount of cooling that the CRAC unit 252-1/252-2 provides for a given amount of input power (e.g., AC electrical power measured in kWs) consumed by the CRAC unit 252-1/252-2. For instance, based on the efficiency of a given CRAC unit (or other cooling unit of cooling system 250), an amount of cooling provided by the CRAC unit may be estimated based on the amount of input power consumed by the CRAC unit over a given period of time.

The power monitoring system 260 of data handling facility 200 monitors different parameters of the data handling facility 200, particularly with respect to the flow of power and data signals through the data handling facility 200. In some embodiments, power monitoring system 260 is communicatively coupled to the network 285 permitting remote monitoring of the data handling facility 200 through the power monitoring system 260. In certain embodiments, power monitoring system 260 may provide real-time or near real-time monitoring information to a user located either onsite at the data handling facility 200 or located remotely via the network 285.

In this exemplary embodiment, power monitoring system 260 includes a plurality of power sensors (e.g., current sensors) for monitoring power consumption (e.g., electrical power consumption in kWs) over time. In this exemplary embodiment, power monitoring system 260 includes a plurality of AC power monitors 262 and a plurality of DC power monitors 264. AC power monitors 262 are connected between the different AC-powered components of power system 210 including, for example, transformer 212, switchgear 214, generator 216, UPS 218, PDU 220, and power supplies 222. DC power monitors 264 are linked to specific pieces of telecommunication equipment of data handling facility 200 such that the electrical power consumed by the respective telecommunication equipment may be individually monitored over time.

At least some of the AC power monitors 262 may comprise preexisting equipment installed, e.g., during the original construction of data handling facility 200. Alternatively, at least some of the AC power monitors may be equipment installed specifically for the purpose of enabling the functionality of PUE monitoring system. The AC power monitors 262 monitor one or more parameters pertaining to the AC electrical power flowing through the given AC power monitor 262. For example, AC power monitors 262 may monitor AC current and voltage over time (e.g., associating the monitored AC current and voltage with a timestamp). In some embodiments, at least some of the AC power monitors 262 may monitor additional parameters including, for example, frequency, phasing, voltage distortion, and the like.

The DC power monitors 264 of power monitoring system 260 are connected between the different DC-powered components of data handling facility 200 including the telecommunication equipment thereof such as, for example, network servers 282, network routers 284, and network switches 286. At least some of the DC power monitors 264 may comprise preexisting equipment installed, e.g., during the original construction of data handling facility 200. Alternatively, at least some of the DC power monitors may be equipment installed specifically for the purpose of enabling the functionality of an PUE monitoring system. The DC power monitors 264 monitor one or more parameters pertaining to the DC electrical power flowing through the given DC power monitor 264. For example, DC power monitors 264 may monitor DC current and voltage over time.

AC power monitors 262 permit the monitoring of the flow of AC electrical power through the data handling facility 200. For example, AC power monitors 262 may be positioned to measure or monitor the amount of electrical power flowing into the UPS 218 of power system 210 over time. In this manner, the AC power monitors 262 may monitor the total amount of electrical power consumed by the digital handling facility (e.g., from electrical grid 205 and/or electrical generator 216) over time.

In addition to the above, one or more of the AC power monitors 262 may be positioned to monitor the amount of power consumed by cooling system 260 over time. For example, one or more of the AC power monitors 262 may be individually linked to or correspond with a unique CRAC unit 252-1/252-2. In this manner, a user (locally or remotely) may monitor, using the AC power monitors 262, the amount of electrical power individually consumed by CRAC units 252-1/252-2 over time. The amount of power consumed by CRAC units 252-1/252-2 over time may provide insight into the amount of cooling required for the data handling facility 200 and the ability of cooling system 250 in meeting those requirements over time. For example, the amount of cooling delivered by cooling system 250 over time may be estimated based on the monitored power consumed by CRAC units 252-1/252-2 and the known efficiencies of the CRAC units 252-1/252/2.

Figure 3:
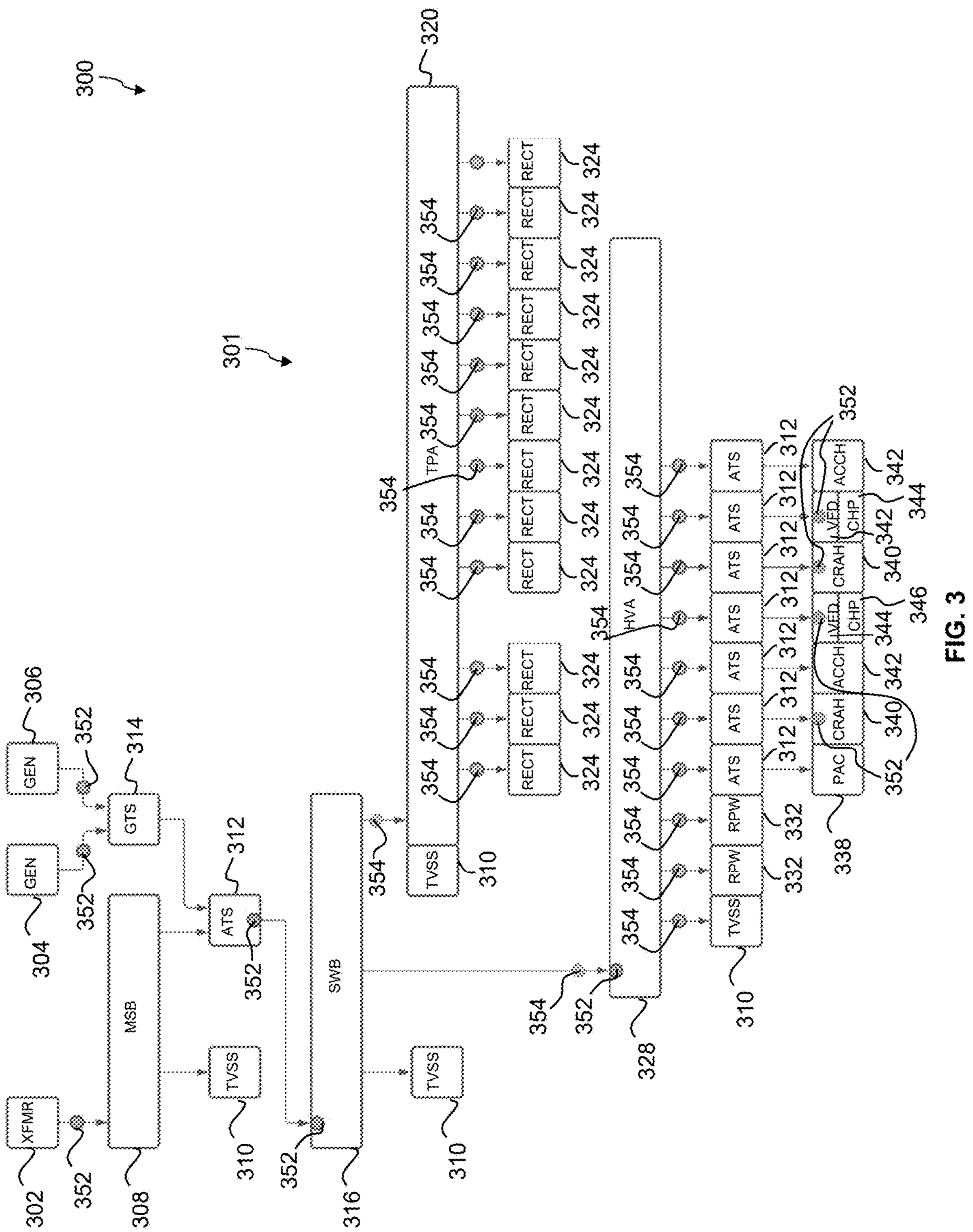
FIG. 3 is a facility power map according to an embodiment of the disclosure.

Referring now to FIG. 3, an embodiment of a facility ontology or power map 300 of a data handling facility (e.g., one of data handling facilities 126 illustrated in FIG. 1) is shown. Particularly, facility power map 300 illustrates an exemplary unproductive power consumption circuit 301 of the data handling facility. Facility power map 300 may also include a separate productive power consumption circuit which may be represented as a separate layer schematically illustrating the telecommunication equipment of the data handling facility responsible for productively consuming power. Alternatively, the productive power consumption circuit of the data handling facility may be represented in a separate facility power map.

Facility power map 300 illustrates schematically at least some of the AC-powered components of the facility power map 300 of a data handling facility. These powered components are indicated on facility power map 300 as separate nodes (e.g., nodes 302, 304, 306, 308) connected by lines or edges. In this exemplary embodiment, facility power map 300 includes nodes in the form of a transformer 302, a portable generator connection 304, and a generator set or "genset" 306. Transformer 302 receives AC electrical power from an electrical grid (e.g., electrical grid 205 illustrated in FIG. 2) while generator connection 304 provides an electrical connection to an auxiliary, portable generator and genset 306 is configured to produce AC electrical power during operation.

In this exemplary embodiment, AC electrical power from transformer 302 is connected via an electrical switching device in the form of a master switch board (MSB) 308. MSB 308 is connected to a transient voltage surge suppressor (TVSS) 310 and an automatic transfer switch (ATS) 312. In this configuration, AC electrical power may flow from the MSB 308 to the ATS 312 for distribution therefrom. In addition, generator connection 304 and genset 306 are each electrically connected to a generator transformer switch (GTS) 314 that is electrically connected, in-turn, to the ATS 312. In this configuration, AC electrical power may flow from the MSB 308 and/or the GTS 314 to the ATS 312.

Facility power map 300 additionally includes additional electrical switching devices in the form of a switchboard (SWB) 316, a TPA fuse panel 320, and a high-voltage switchboard (HVA) 328. SWB 316 is electrically connected and receives AC electrical power from the ATS 312 connected to both MSB 308 and GTS 314. In-turn, SWB 316 is electrically connected and supplies AC electrical power to both the TPA fuse panel 320 and the HVA 328, where each of the SWB 316, TPA fuse panel 320, and HVA 328 are connected to a dedicated TVSS 310 connected to ground.

The TPA fuse panel 320 is electrically connected with and supplies AC electrical power to a plurality of rectifiers 324 and which convert the received AC electrical power into DC electrical power for powering telecommunication equipment of the data handling facility that is connected to the respective rectifier 324. In some instances, rectifiers 324 may form a component of a power supply of a given piece of telecommunication equipment.

The HVA 328 is electrically connected with and provided AC electrical power to one or more protective relays 332 and a plurality of ATSs 312. In-turn, ATSs 312 electrically connected to HVA 328 are electrically connected with, and provide AC electrical power to a Packaged Air Conditioner (PAC) 338, one or more Computer Room Air Handlers (CRAHs) 340, one or more Variable Frequency Drives (VFDs) 344 and corresponding one or more combined heat and power systems (CHPs) 346 connected therewith, an Air Cooled Chiller (ACCH) 342. Thus, the HVA 328 electrically powers the Heating, Ventilation, and Air Conditioning (HVAC) equipment of the data handling facility including the equipment used to cool the telecommunication equipment thereof (e.g., CRAHs 340, ACCH 342).

In addition to the components discussed above, facility power map 300 identifies the locations of power sensors or monitors of the data handling facility. Particularly, in this exemplary embodiment, facility power map 300 indicates a plurality of power monitors 352 installed at the data handling facility to facilitate the generation of facility power map 300. Power monitors 352 may monitor one or more different parameters of the AC electrical power circulated through the given power monitor 352. For instance, power monitors 352 may monitor electrical voltage, current, power, frequency, and/or phase.

In some embodiments, the productive power consumption circuit 301 includes each of the nodes and intervening connections shown in the facility power map 300. However, in other embodiments, productive power consumption circuit 301 may only include a subset of the nodes included in map 300 such as, for example, PAC 338, CRAHs 340, ACCH 342, VFDs 344, and CHPs 346 directly responsible for delivering cooling to telecommunication equipment of the data handling facility.

Figure 4:
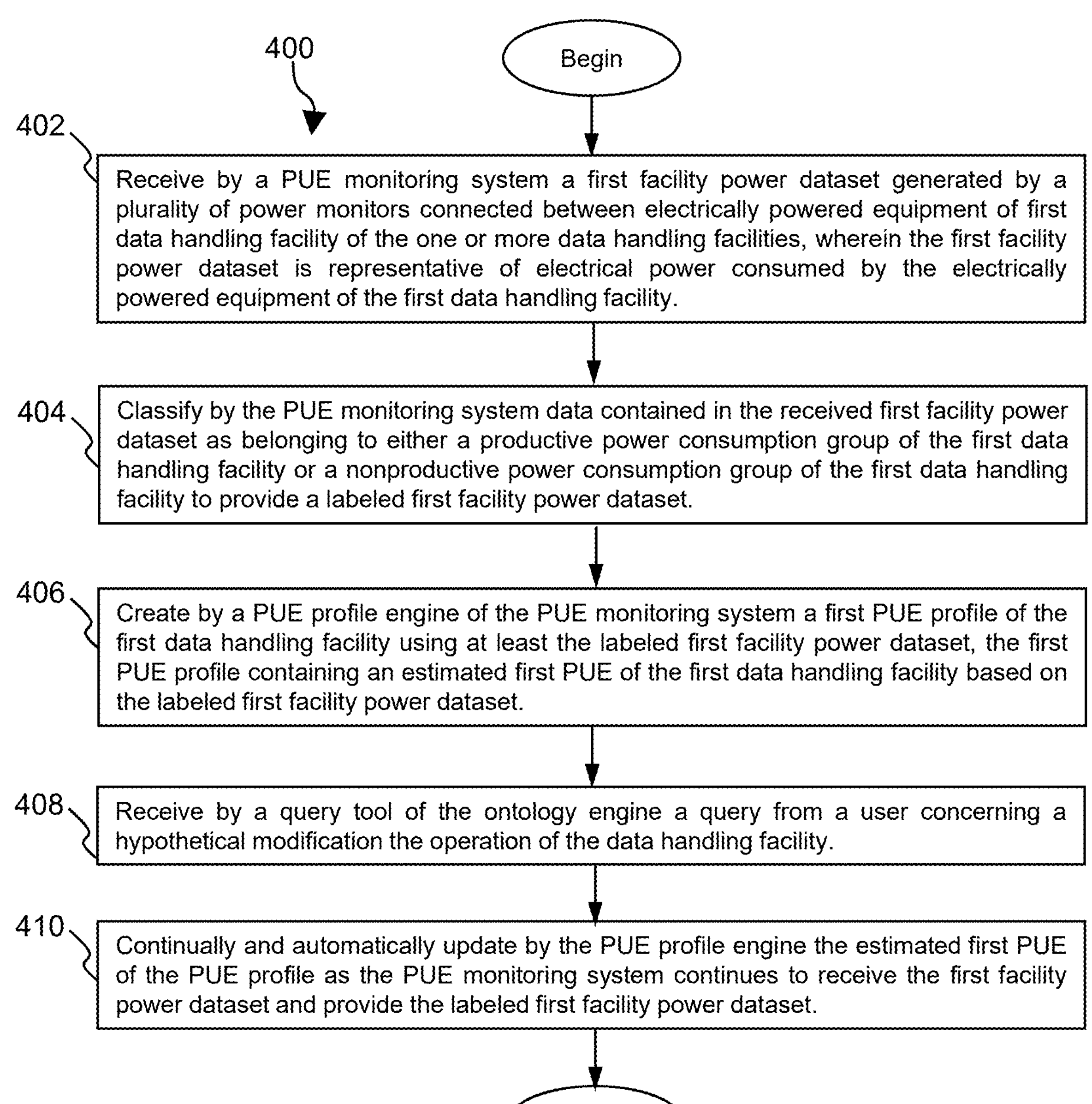
FIG. 4 is flow chart of a method for a method for directly estimating PUE of one or more data handling facilities of a communication system according to an embodiment of the disclosure.

Turning to FIG. 4, a method 400 is described. In an embodiment, the method 400 is a method for directly estimating PUE of one or more data handling facilities (e.g., data handling facilities 126 illustrated in FIG. 1 and/or data handling facility 200 illustrated in FIG. 2) of a communication system (e.g., communication system 100 illustrated in FIG. 1). Method 400 may also be said to comprise a method of operating and/or maintaining a data handling facility and/or a communication system. At block 402, method 400 comprises receiving by a PUE monitoring system (e.g., PUE monitoring system 160 illustrated in FIG. 1) a first facility power dataset (e.g., facility power dataset 142 illustrated in FIG. 1) generated by a plurality of power monitors (e.g. power monitors 262 and 264 illustrated in FIG. 1 and/or power monitors 352 illustrated in FIG. 1) connected between electrically powered equipment (e.g., of first data handling facility of the one or more data handling facilities, wherein the first facility power dataset is representative of electrical power consumed by the electrically powered equipment (e.g., electrically powered equipment of power system 210, cooling system 250, and/or power monitoring system 260 illustrated in FIG. 2) of the first data handling facility.

At block 404, method 400 comprises classifying by the PUE monitoring system data contained in the received first facility power dataset as belonging to either a productive power consumption group of the first data handling facility or a nonproductive power consumption group (e.g., nonproductive power consumption circuit 301 illustrated in FIG. 3) of the first data handling facility to provide a labeled first facility power dataset. At block 406, method 400 comprises creating by a PUE profile engine (e.g., PUE profile engine 164 illustrated in FIG. 1) of the PUE monitoring system a first PUE profile (e.g., facility PUE profile 144 illustrated in FIG. 1) of the first data handling facility using at least the labeled first facility power dataset, the first PUE profile containing an estimated first PUE of the first data handling facility based on the labeled first facility power dataset. At block 408, method 400 comprises receiving by a query tool (e.g., query tool 166 shown in FIG. 1) of the ontology engine a query from a user concerning a hypothetical modification of the operation of the data handling facility 126 illustrated in FIG. 1 and/or data handling facility 200 illustrated in FIG. 2). At block 410, method 400 comprises continually and automatically updating by the PUE profile engine the estimated first PUE of the PUE profile as the PUE monitoring system continues to receive the first facility power dataset and provide the labeled first facility power dataset.

Figure 5:
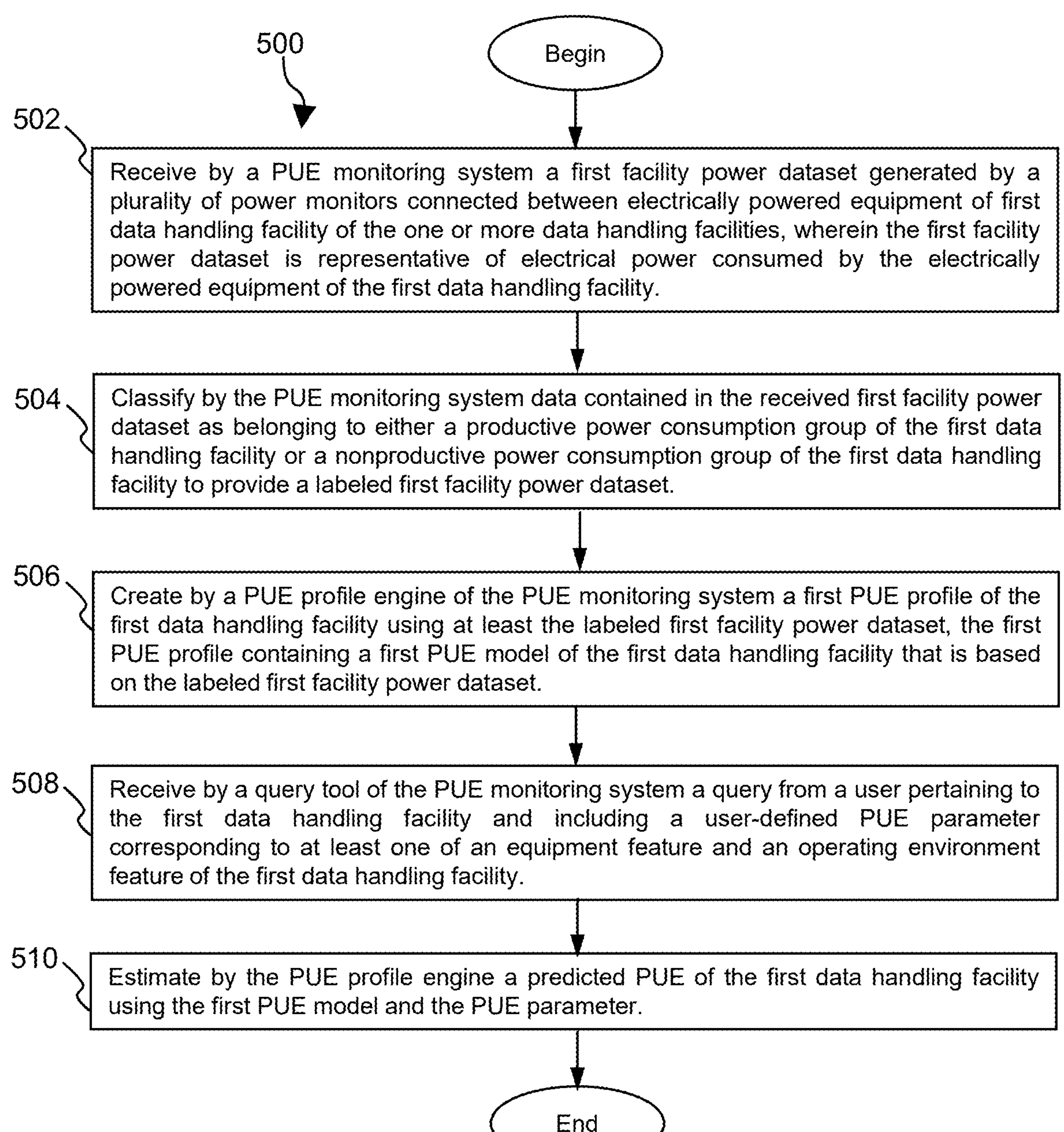
FIG. 5 is flow chart of another method for a method for directly estimating PUE of one or more data handling facilities of a communication system according to an embodiment of the disclosure.

Turning to FIG. 5, a method 500 is described. In an embodiment, the method 500 is a method for directly estimating PUE of one or more data handling facilities (e.g., data handling facilities 126 illustrated in FIG. 1 and/or data handling facility 200 illustrated in FIG. 2) of a communication system (e.g., communication system 100 illustrated in FIG. 1). Method 500 may also be said to comprise a method of operating and/or maintaining a data handling facility and/or a communication system. At block 502, method 500 comprises receiving by a PUE monitoring system (e.g., PUE monitoring system 160 illustrated in FIG. 1) a first facility power dataset (e.g., facility power dataset 142 illustrated in FIG. 1) generated by a plurality of power monitors (e.g. power monitors 262 and 264 illustrated in FIG. 1 and/or power monitors 352 illustrated in FIG. 1) connected between electrically powered equipment (e.g., of first data handling facility of the one or more data handling facilities, wherein the first facility power dataset is representative of electrical power consumed by the electrically powered equipment (e.g., electrically powered equipment of power system 210, cooling system 250, and/or power monitoring system 260 illustrated in FIG. 2) of the first data handling facility.

At block 504, method 500 comprises classifying by the PUE monitoring system data contained in the received first facility power dataset as belonging to either a productive power consumption group of the first data handling facility or a nonproductive power consumption group (e.g., nonproductive power consumption circuit 301 illustrated in FIG. 3) of the first data handling facility to provide a labeled first facility power dataset. At block 506, method 500 comprises creating by a PUE profile engine (e.g., PUE profile engine 164 illustrated in FIG. 1) of the PUE monitoring system a first PUE profile (e.g., facility PUE profile 144 illustrated in FIG. 1) of the first data handling facility using at least the labeled first facility power dataset and the first PUE profile containing a first PUE model (e.g., PUE models 145 illustrated in FIG. 1) of the first data handling facility that is based on the labeled first facility power dataset.

At block 508, method 500 comprises receiving by a query tool (e.g., query tool 166 illustrated in FIG. 1) of the PUE monitoring system a query from a user pertaining to the first data handling facility and including a user-defined PUE parameter corresponding to at least one of an equipment feature and an operating environment feature of the first data handling facility. At block 510, method 500 comprises estimating by the PUE profile engine a predicted PUE of the first data handling facility using the first PUE model and the PUE parameter.

Figure 6:
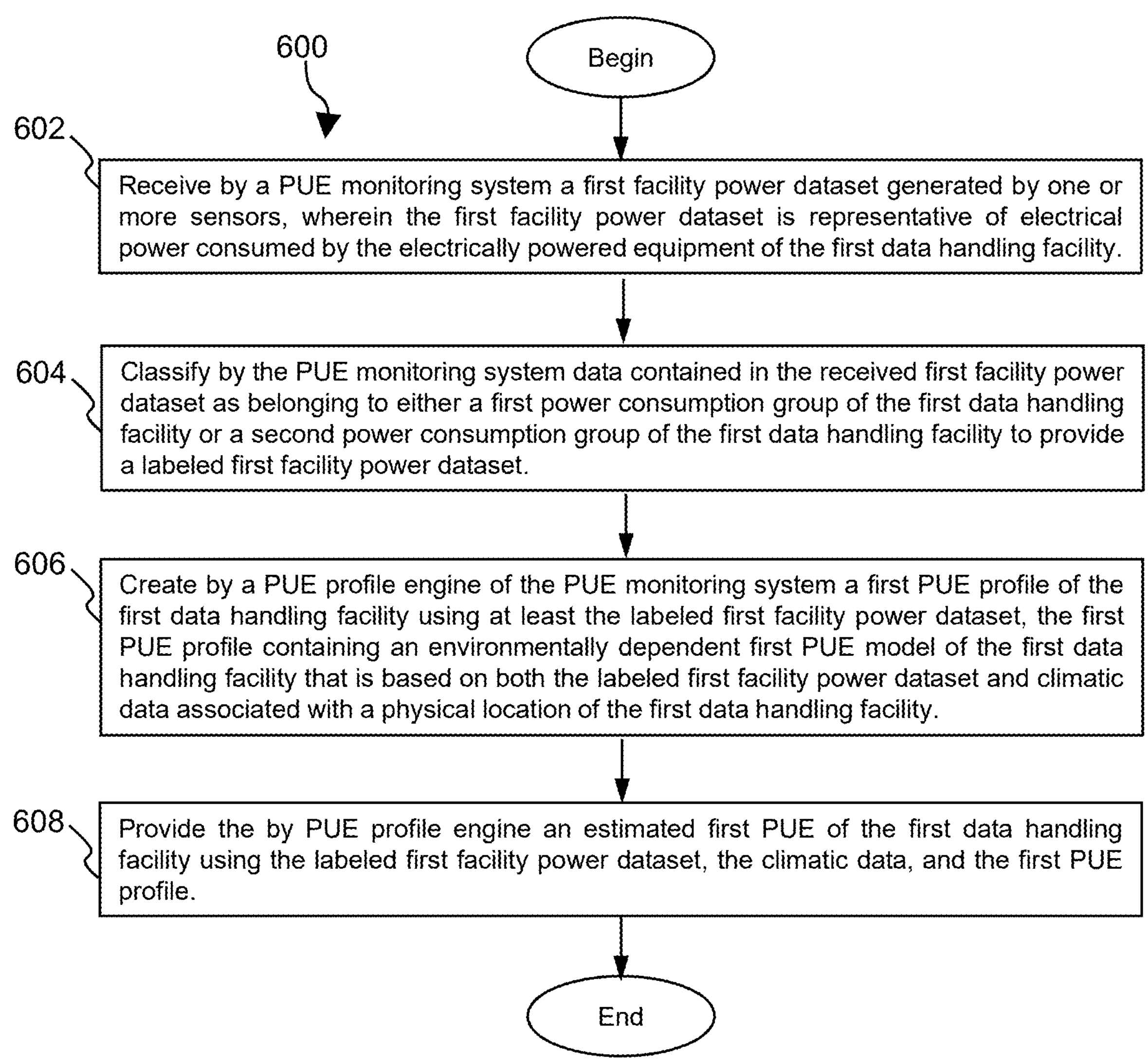
FIG. 6 is flow chart of another method for a method for directly estimating PUE of one or more data handling facilities of a communication system according to an embodiment of the disclosure.

Turning to FIG. 6, a method 600 is described. In an embodiment, the method 600 is a method for estimating PUE of one or more data handling facilities (e.g., data handling facilities 126 illustrated in FIG. 1 and/or data handling facility 200 illustrated in FIG. 2). Method 600 may also be said to comprise a method of operating and/or maintaining a data handling facility and/or a communication system. At block 602, method 600 comprises receiving by a PUE monitoring system (e.g., PUE monitoring system 160 illustrated in FIG. 1) a first facility power dataset (e.g., facility power dataset 142 illustrated in FIG. 1) generated by one or more sensors, wherein the first facility power dataset is representative of electrical power consumed by the electrically powered equipment (e.g., electrically powered equipment of power system 210, cooling system 250, and/or power monitoring system 260 illustrated in FIG. 2) of the first data handling facility.

At block 604, method 600 comprises classifying by the PUE monitoring system data contained in the received first facility power dataset as belonging to either a first power consumption group of the first data handling facility or a second power consumption group (e.g., nonproductive power consumption circuit 301 illustrated in FIG. 3) of the first data handling facility to provide a labeled first facility power dataset.

At block 606, method 600 comprises creating by a PUE profile engine (e.g., PUE profile engine 164 illustrated in FIG. 1) of the PUE monitoring system a first PUE profile (e.g., facility PUE profiles 144 illustrated in FIG. 1) of the first data handling facility using at least the labeled first facility power dataset, the first PUE profile containing an environmentally dependent first PUE model (e.g., PUE models 145 illustrated in FIG. 1) of the first data handling facility that is based on both the labeled first facility power dataset and climatic data associated with a physical location of the first data handling facility. At block 608, method 600 comprises providing the by PUE profile engine an estimated first PUE of the first data handling facility using the labeled first facility power dataset, the climatic data, and the first PUE profile.

Figure 7A:
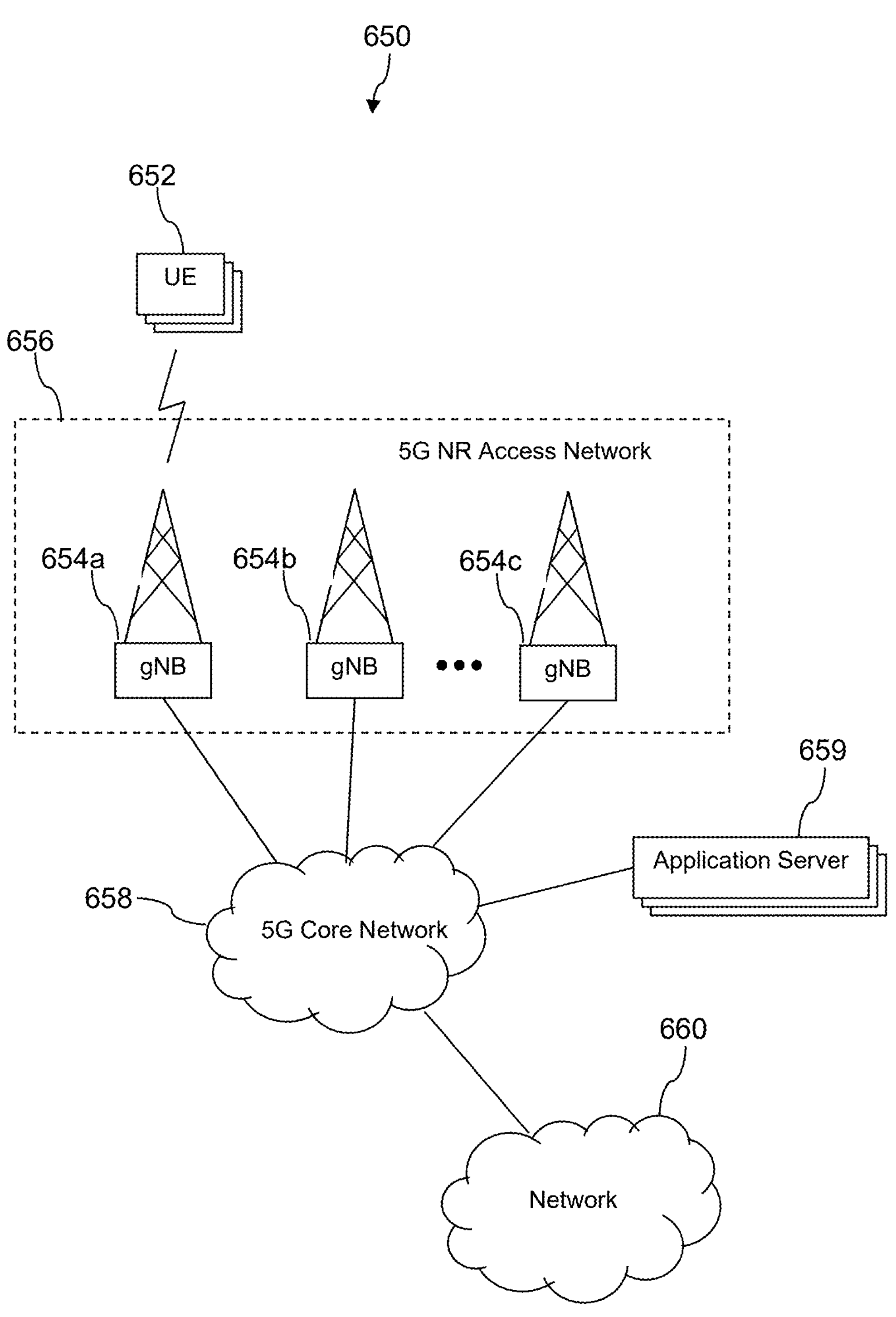
FIG. 7A is a block diagram of another communication system according to an embodiment of the disclosure.

Turning now to FIG. 7A, an exemplary communication system 650 is described. Typically, the communication system 650 includes a number of access nodes 654 that are configured to provide coverage in which UEs 652 such as cell phones, tablet computers, machine-type-communication devices, tracking devices, embedded wireless modules, and/or other wirelessly equipped communication devices (whether or not user operated), can operate. The access nodes 654 may be said to establish an access network 656. The access network 656 may be referred to as a radio access network (RAN) in some contexts.

In a 5G technology generation an access node 654 may be referred to as a next Generation Node B (gNB). In 4G technology (e.g., long term evolution (LTE) technology) an access node 654 may be referred to as an evolved Node B (eNB). In 3G technology (e.g., code division multiple access (CDMA) and global system for mobile communication (GSM)) an access node 654 may be referred to as a base transceiver station (BTS) combined with a base station controller (BSC). In some contexts, the access node 654 may be referred to as a cell site or a cell tower. In some implementations, a picocell may provide some of the functionality of an access node 654, albeit with a constrained coverage area. Each of these different embodiments of an access node 654 may be considered to provide roughly similar functions in the different technology generations.

In an embodiment, the access network 656 comprises a first access node 654*a*, a second access node 654*b*, and a third access node 654*c*. It is understood that the access network 656 may include any number of access nodes 654. Further, each access node 654 could be coupled with a core network 658 that provides connectivity with various application servers 659 and/or a network 660. In an embodiment, at least some of the application servers 659 may be located close to the network edge (e.g., geographically close to the UE 652 and the end user) to deliver so-called "edge computing." The network 660 may be one or more private networks, one or more public networks, or a combination thereof. The network 660 may comprise the public switched telephone network (PSTN). The network 660 may comprise the Internet. With this arrangement, a UE 652 within coverage of the access network 656 could engage in air-interface communication with an access node 654 and could thereby communicate via the access node 654 with various application servers and other entities.

The communication system 650 could operate in accordance with a particular radio access technology (RAT), with communications from an access node 654 to UEs 652 defining a downlink or forward link and communications from the UEs 652 to the access node 654 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 654 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 654 could define an air interface configured in a specific manner to define physical resources for carrying information wirelessly between the access node 654 and UEs 652.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 652.

In addition, certain resource elements on the example air interface could be reserved for special purposes. For instance, on the downlink, certain resource elements could be reserved to carry synchronization signals that UEs 652 could detect as an indication of the presence of coverage and to establish frame timing, other resource elements could be reserved to carry a reference signal that UEs 652 could measure in order to determine coverage strength, and still other resource elements could be reserved to carry other control signaling such as PRB-scheduling directives and acknowledgement messaging from the access node 654 to served UEs 652. And on the uplink, certain resource elements could be reserved to carry random access signaling from UEs 652 to the access node 654, and other resource elements could be reserved to carry other control signaling such as PRB-scheduling requests and acknowledgement signaling from UEs 652 to the access node 654.

The access node 654, in some instances, may be split functionally into a radio unit (RU), a distributed unit (DU), and a central unit (CU) where each of the RU, DU, and CU have distinctive roles to play in the access network 656. The RU provides radio functions. The DU provides L1 and L2 real-time scheduling functions; and the CU provides higher L2 and L3 non-real-time scheduling. This split supports flexibility in deploying the DU and CU. The CU may be hosted in a regional cloud data center. The DU may be co-located with the RU, or the DU may be hosted in an edge cloud data center.

Figure 7B:
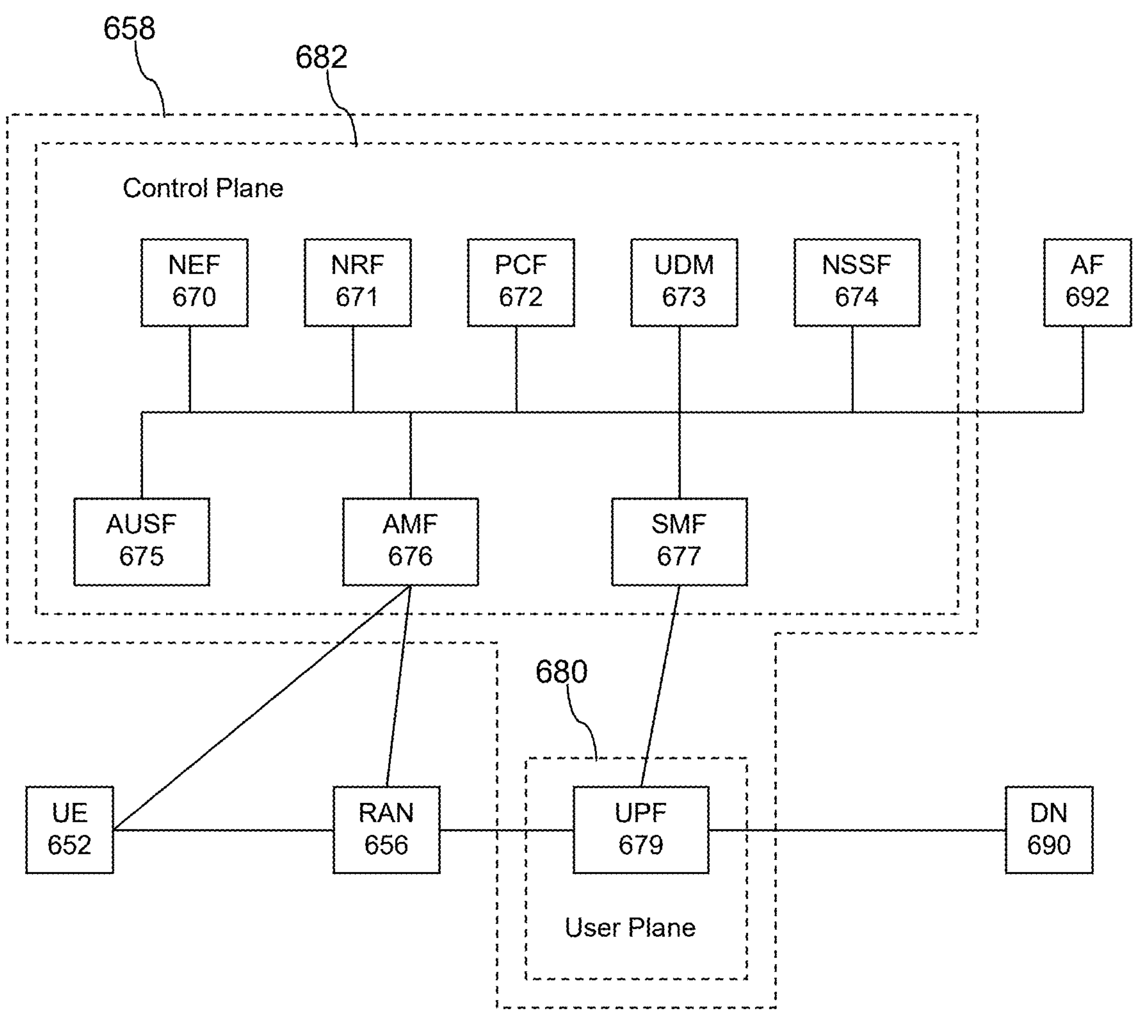
FIG. 7B is a block diagram of a core network of the communication system of FIG. 7A according to an embodiment of the disclosure.

Turning now to FIG. 7B, further details of the core network 658 are described. In an embodiment, the core network 658 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 679, an authentication server function (AUSF) 675, an access and mobility management function (AMF) 676, a SMF 677, a network exposure function (NEF) 670, a network repository function (NRF) 671, a policy control function (PCF) 672, a UDM 673, a network slice selection function (NSSF) 674, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 658 may be segregated into a user plane 680 and a control plane 682, thereby promoting independent scalability, evolution, and flexible deployment.

The UPF 679 delivers packet processing and links the UE 652, via the access network 656, to a data network 690 (e.g., the network 660 illustrated in FIG. 7A). The AMF 676 handles registration and connection management of non-access stratum (NAS) signaling with the UE 652. Said in other words, the AMF 676 manages UE registration and mobility issues. The AMF 676 manages reachability of the UEs 652 as well as various security issues. The SMF 677 handles session management issues. Specifically, the SMF 677 creates, updates, and removes (destroys) PDU sessions and manages the session context within the UPF 679. The SMF 677 decouples other control plane functions from user plane functions by performing dynamic host configuration protocol (DHCP) functions and IP address management functions. The AUSF 675 facilitates security processes.

The NEF 670 securely exposes the services and capabilities provided by network functions. The NRF 671 supports service registration by network functions and discovery of network functions by other network functions. The PCF 672 supports policy control decisions and flow based charging control. The UDM 673 manages network user data and can be paired with a user data repository (UDR) that stores user data such as customer profile information, customer authentication number, and encryption keys for the information. An application function 692, which may be located outside of the core network 658, exposes the application layer for interacting with the core network 658. In an embodiment, the application function 692 may be executed on an application server 659 located geographically proximate to the UE 652 in an "edge computing" deployment mode. The core network 658 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 674 can help the AMF 676 to select the network slice instance (NSI) for use with the UE 652.

Figure 8:
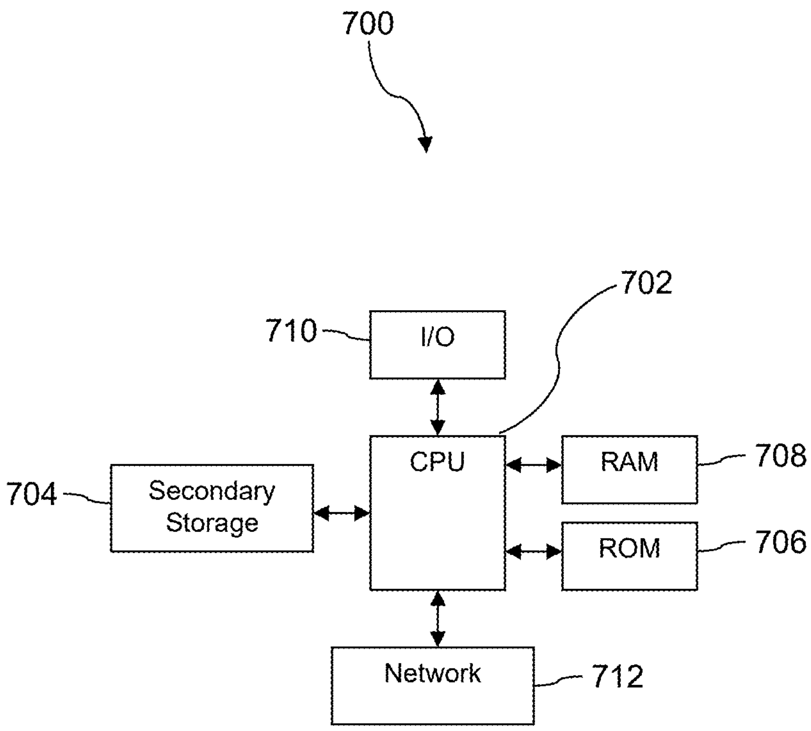
FIG. 8 is a block diagram of a computer system according to an embodiment of the disclosure.

FIG. 8 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 702 may execute a computer program or application. For example, the CPU 702 may execute software or firmware stored in the ROM 706 or stored in the RAM 708. In some cases, on boot and/or when the application is initiated, the CPU 702 may copy the application or portions of the application from the secondary storage 704 to the RAM 708 or to memory space within the CPU 702 itself, and the CPU 702 may then execute instructions that the application is comprised of. In some cases, the CPU 702 may copy the application or portions of the application from memory accessed via the network connectivity devices 712 or via the I/O devices 710 to the RAM 708 or to memory space within the CPU 702, and the CPU 702 may then execute instructions that the application is comprised of. During execution, an application may load instructions into the CPU 702, for example load some of the instructions of the application into a cache of the CPU 702. In some contexts, an application that is executed may be said to configure the CPU 702 to do something, e.g., to configure the CPU 702 to perform the function or functions promoted by the subject application. When the CPU 702 is configured in this way by the application, the CPU 702 becomes a specific purpose computer or a specific purpose machine.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 712 may provide wired communication links and/or wireless communication links (e.g., a first network connectivity device 712 may provide a wired communication link and a second network connectivity device 712 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk-based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a dataset by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for directly estimating power utilization effectiveness (PUE) of one or more data handling facilities of a communication system, the method comprising:

receiving by a PUE monitoring system a first facility power dataset generated by a plurality of power monitors connected between electrically powered equipment a of first data handling facility of the one or more data handling facilities, wherein the first facility power dataset is representative of electrical power consumed by the electrically powered equipment of the first data handling facility;

classifying by the PUE monitoring system data contained in the received first facility power dataset as belonging to either a productive power consumption group of the first data handling facility or a nonproductive power consumption group of the first data handling facility to provide a labeled first facility power dataset;

creating by a PUE profile engine of the PUE monitoring system a first PUE profile of the first data handling facility using at least the labeled first facility power dataset, the first PUE profile containing an estimated first PUE of the first data handling facility based on the labeled first facility power dataset; and continually and automatically updating by the PUE profile engine the estimated first PUE of the PUE profile as the PUE monitoring system continues to receive the first facility power dataset and provide the labeled first facility power dataset.

2. The method of claim 1, further comprising:

reallocating at least one of telecommunication equipment, power system equipment, and cooling system equipment between the first data handling facility and another of the one or more data handling facilities of the communication system based on the estimated PUE of the first data handling facility as updated by the PUE profile engine.

3. The method of claim 1, further comprising:

continually and automatically updating within twenty-four hours by the PUE profile engine the estimated first PUE of the PUE profile.

4. The method of claim 1, wherein the estimated first PUE of the PUE profile is based on climatic data associated with a physical location of the first data handling facility.

5. The method of claim 1, further comprising:

receiving by a query tool of the PUE monitoring system a query from a user pertaining to the first data handling facility and including a PUE parameter corresponding to at least one of an equipment feature of the first data handling facility and an operating environment feature of the first data handling facility; and estimating by the PUE profile engine a predicted PUE of the first data handling facility using the PUE parameter and a first PUE model of the first data handling facility contained in the first PUE profile.

6. A method for directly estimating power utilization effectiveness (PUE) of one or more data handling facilities of a communication system, the method comprising:

receiving by a PUE monitoring system a first facility power dataset generated by a plurality of power monitors connected between electrically powered equipment of a first data handling facility of the one or more data handling facilities, wherein the first facility power dataset is representative of electrical power consumed by the electrically powered equipment of the first data handling facility;

classifying by the PUE monitoring system data contained in the received first facility power dataset as belonging to either a productive power consumption group of the first data handling facility or a nonproductive power consumption group of the first data handling facility to provide a labeled first facility power dataset;

creating by a PUE profile engine of the PUE monitoring system a first PUE profile of the first data handling facility using at least the labeled first facility power dataset, the first PUE profile containing a first PUE model of the first data handling facility that is based on the labeled first facility power dataset;

receiving by a query tool of the PUE monitoring system a query from a user pertaining to the first data handling facility and including a user-defined PUE parameter corresponding to at least one of an equipment feature and an operating environment feature of the first data handling facility; and estimating by the PUE profile engine a predicted PUE of the first data handling facility using the first PUE model and the PUE parameter.

7. The method of claim 6, further comprising:

reallocating at least one of telecommunication equipment, power system equipment, and cooling system equipment between the first data handling facility and another of the one or more data handling facilities of the communication system based on the predicted PUE of the first data handling facility.

8. The method of claim 6, wherein the PUE parameter corresponds to the equipment feature which comprises a user-defined alteration to at least one of telecommunication equipment, power system equipment, and cooling system equipment of the first data handling facility.

9. The method of claim 6, wherein the PUE parameter corresponds to the operating environment feature and comprises a user-defined future date whereby the predicted PUE corresponds to a predicted PUE of the first data handling facility on the future date.

10. The method of claim 6, wherein the first PUE model comprises a temperature-dependent first PUE model and the PUE parameter corresponds to the operating environment feature and comprises a user-defined ambient weather condition associated with a physical location of the first data handling facility whereby the predicted PUE corresponds to a predicted PUE of the first data handling facility as the first data handling facility encounters the ambient weather condition.

11. A method for estimating power utilization effectiveness (PUE) of one or more data handling facilities, the method comprising:

receiving by a PUE monitoring system a first facility power dataset generated by one or more sensors, wherein the first facility power dataset is representative of electrical power consumed by electrically powered equipment of a first data handling facility;

classifying by the PUE monitoring system data contained in the received first facility power dataset as belonging to either a first power consumption group of the first data handling facility or a separate second power consumption group of the first data handling facility to provide a labeled first facility power dataset;

creating by a PUE profile engine of the PUE monitoring system a first PUE profile of the first data handling facility using at least the labeled first facility power dataset, the first PUE profile containing an environmentally dependent first PUE model of the first data handling facility that is based on both the labeled first facility power dataset and climatic data associated with a physical location of the first data handling facility; and providing by the PUE profile engine an estimated first PUE of the first data handling facility using the labeled first facility power dataset, the climatic data, and the first PUE profile.

12. The method of claim 11, further comprising:

reallocating at least one of telecommunication equipment, power system equipment, and cooling system equipment between the first data handling facility and another of the one or more data handling facilities of the communication system based on the estimated PUE of the first data handling facility.

13. The method of claim 11, further comprising:

continually updating by the PUE profile engine the estimated first PUE of the PUE profile as the PUE monitoring system continues to receive the first facility power dataset and provide the labeled first facility power dataset.

14. The method of claim 11, further comprising:

receiving by a query tool of the PUE monitoring system a query from a user pertaining to the first data handling facility and including a user-defined PUE parameter corresponding to at least one of an equipment feature and an operating environment feature of the first data handling facility; and estimating by the PUE profile engine a predicted PUE of the first data handling facility using the first PUE model and the PUE parameter.

15. The method of claim 11, wherein the climatic data comprises temperature trend data in outdoor ambient temperature for the physical location of the first data handling facility that extend at least a decade in length.

16. The method of claim 11, further comprising:

receiving by a query tool of the PUE monitoring system a query from a user pertaining to the first data handling facility and including a user-defined PUE parameter comprising a user-defined future date; and estimating by the PUE profile engine a predicted PUE of the first data handling facility using the first PUE model and the PUE parameter, wherein the predicted PUE corresponds to a predicted PUE of the first data handling facility on the future date and that is based on the climatic data.

17. The method of claim 11, wherein the one or more sensors comprise one or more electrical power monitors.

18. The method of claim 11, wherein the one or more sensors comprises a plurality of power monitors connected between electrically powered equipment of first data handling facility of the one or more data handling facilities.

19. The method of claim 11, wherein the first power consumption group comprises a productive power consumption group of the first data handling facility and the second power consumption group comprises a nonproductive power consumption group of the first data handling facility.

20. The method of claim 11, wherein the environmentally dependent first PUE model comprises a temperature-dependent first PUE model.

* * * * *